(12) United States Patent
Kobayashi et al.

(10) Patent No.: US 6,390,919 B1
(45) Date of Patent: May 21, 2002

(54) ENTERTAINMENT SYSTEM, ENTERTAINMENT APPARATUS, RECORDING MEDIUM, AND PROGRAM

(75) Inventors: Takaki Kobayashi; Eiji Uriya, both of Hokkaido; Akira Koike, Tokyo, all of (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/653,204

(22) Filed: Aug. 31, 2000

(30) Foreign Application Priority Data

Aug. 31, 1999 (JP) .......................................... 11-245907

(51) Int. Cl.$^7$ .............................. A63F 9/24; G06F 17/00
(52) U.S. Cl. .............................. 463/36; 463/37; 463/38; 463/35
(58) Field of Search .............................. 463/37, 47, 30, 463/1, 36–38; 273/148 R, 148 B; 345/156, 157, 161, 169, 163, 172, 177; 381/118, 119

(56) References Cited

U.S. PATENT DOCUMENTS

| | | | | |
|---|---|---|---|---|
| 5,212,733 A | * | 5/1993 | DeVitt et al. ................ | 381/119 |
| 5,592,609 A | * | 1/1997 | Suzuki et al. ................ | 395/173 |
| 5,608,807 A | * | 3/1997 | Brunelle ...................... | 381/119 |
| 5,769,719 A | * | 6/1998 | Hsu ............................. | 463/37 |
| 5,876,286 A | | 3/1999 | Lee | |
| 5,897,437 A | * | 4/1999 | Nishiumi et al. ............. | 463/47 |
| 6,071,194 A | * | 6/2000 | Sanderson et al. ........... | 463/37 |
| 6,147,674 A | * | 11/2000 | Rosenberg et al. ......... | 345/157 |
| 6,169,540 B1 | * | 1/2001 | Rosenberg et al. ......... | 345/326 |
| 6,200,253 B1 | * | 3/2001 | Nishiumi et al. ............ | 463/47 |

FOREIGN PATENT DOCUMENTS

| | | |
|---|---|---|
| EP | 0 867 212 A1 | 9/1998 |
| JP | 10-295397 | 11/1998 |

OTHER PUBLICATIONS

A partial translation of JP 10-295397, in the form of an abstract thereof, is attached.
PCT International Search Report is attached.

* cited by examiner

Primary Examiner—Jessica J. Harrison
Assistant Examiner—Alex F. R. P. Rada, II
(74) Attorney, Agent, or Firm—Paul A. Guss

(57) ABSTRACT

An entertainment system has an entertainment apparatus for executing various programs, a manual controller for entering manual control requests from a user into the entertainment apparatus, a monitor for displaying images outputted from the entertainment apparatus, and a speaker for outputting sounds outputted from the entertainment apparatus. The manual controller has motors for imparting vibrations to the user in response to an external request. The entertainment system also has a vibration/sound setting unit for setting up a length of a bar displayed on the monitor according to a control input from the manual controller, setting up a magnitude of vibrations to be generated by the motors depending on the length of the bar, and setting up a type and/or a pitch of sound to be outputted to the speaker depending on the length of the bar.

30 Claims, 37 Drawing Sheets

FIG. 20

PERCUSSION INSTRUMENT INFORMATION TABLE

| | |
|---|---|
| RECORD 0 | PERCUSSION INSTRUMENT SOUND INDICATION DATA (BASS DRUM I) |
| RECORD 1 | PERCUSSION INSTRUMENT SOUND INDICATION DATA (BASS DRUM II) |
| RECORD 2 | PERCUSSION INSTRUMENT SOUND INDICATION DATA (SNARE DRUM) |
| RECORD 3 | PERCUSSION INSTRUMENT SOUND INDICATION DATA (HIGH HAT CYMBALS (CLOSED)) |
| RECORD 4 | PERCUSSION INSTRUMENT SOUND INDICATION DATA (HIGH HAT CYMBALS (OPEN)) |
| RECORD 5 | PERCUSSION INSTRUMENT SOUND INDICATION DATA (MARACAS) |
| RECORD 6 | PERCUSSION INSTRUMENT SOUND INDICATION DATA (WOODEN CLAPPERS) |
| RECORD 7 | PERCUSSION INSTRUMENT SOUND INDICATION DATA (CONGA) |

FIG. 21

PITCH INFORMATION TABLE

| RECORD 0 | PITCH INDICATION DATA (C) |
|---|---|
| RECORD 1 | PITCH INDICATION DATA (D) |
| RECORD 2 | PITCH INDICATION DATA (E) |
| RECORD 3 | PITCH INDICATION DATA (F) |
| RECORD 4 | PITCH INDICATION DATA (G) |
| RECORD 5 | PITCH INDICATION DATA (A) |
| RECORD 6 | PITCH INDICATION DATA (B) |
| RECORD 7 | PITCH INDICATION DATA (C) |

ENTERTAINMENT SYSTEM, ENTERTAINMENT APPARATUS, RECORDING MEDIUM, AND PROGRAM

BACKGROUND OF THE INVENTION

1. Field of the Invention

The present invention relates to an entertainment system connected to an entertainment apparatus which executes various programs and having at least one manual controller for entering control requests from a user into the entertainment apparatus, an entertainment apparatus for executing various programs, a recording medium which stores a program and data for use by the entertainment system, and a program itself.

2. Description of the Related Art

Some entertainment systems including entertainment apparatus such as video game machines display video game images based on video game data stored in a recording medium such as a CD-ROM or the like on the display screen of a television receiver while allowing the user or game player to play the video game with commands entered via a manual controller.

In those entertainment systems, the entertainment apparatus and the manual controller are usually connected to each other by a serial interface. When a clock signal is supplied from the entertainment apparatus to the manual controller, the manual controller sends key switch information based on the user's control entries in synchronism with the clock signal.

Recently developed manual controllers incorporate a vibration generating means for applying vibrations to the user based on a request from an external apparatus such as an entertainment apparatus, for example. While a video game is in progress, the vibration generating means applies various different kinds of vibrations to the user in response to user's different control entries.

In an entertainment system including a manual controller with the above vibration applying function, the magnitudes of vibrations that can be generated are preset according to a video game program, and those vibrations are generated at predetermined times such as when a principal character in a video game enters a certain scene or when a principal character in a shooting game is damaged, for example.

There has not been available a system which permits the user to receive vibrations that the user prefers.

Many types of software that enable the user to compose music in the way the user likes are available in the market. However, the commercially available music composition software products are problematic in that they are difficult to operate and need a large expenditure of time and labor on the part of the user until the user masters how to use the music composition software.

SUMMARY OF THE INVENTION

It is therefore an object of the present invention to provide an entertainment system, an entertainment apparatus, a recording medium, and a program which allow a user to set up the magnitudes of vibrations and also permit the user to receive vibrations that the user likes at any time the user wants.

Another object of the present invention is to provide an entertainment system, an entertainment apparatus, a recording medium, and a program which allow the user to visually set up the types of musical instruments and pitches thereof easily by changing the lengths of bars displayed on a monitor.

Still another object of the present invention is to provide an entertainment system, an entertainment apparatus, a recording medium, and a program which allow the user to set up the magnitudes of vibrations, permit the user to receive vibrations that the user likes at any time the user wants, and also allow the user to visually set up the types of musical instruments and pitches thereof easily.

According to an aspect of the present invention, there is provided an entertainment system comprising an entertainment apparatus for executing various programs, at least one manual controller for entering manual control requests from the user into the entertainment apparatus, a display unit for displaying images outputted from the entertainment appratus, the manual controller having a vibration generating device for imparting vibrations to the user in response to an external request, and vibration setting means for setting up a length of a bar displayed on the display unit according to a control input from the manual controller, and setting up a magnitude of vibrations to be generated by the vibration generating device depending on the length of the bar.

According to another aspect of the present invention, there is provided an entertainment apparatus for connection to a manual controller for outputting at least a control request from the user, the manual controller having a vibration generating device for imparting vibrations to the user in response to an external request, and a display unit for displaying images, comprising vibration setting means for setting up a length of a bar displayed on the display unit according to a control input from the manual controller, and setting up a magnitude of vibrations to be generated by the vibration generating device depending on the length of the bar.

According to still another aspect of the present invention, there is provided a recording medium storing a program and data for use in an entertainment system having an entertainment apparatus for executing various programs, at least one manual controller for entering manual control requests from the user into the entertainment apparatus, and a display unit for displaying images outputted from the entertainment apparatus, the manual controller having a vibration generating device for imparting vibrations to the user in response to an external request, the program stored in the recording medium comprising the step of setting up a length of a bar displayed on the display unit according to a control input from the manual controller, and setting up a magnitude of vibrations to be generated by the vibration generating device depending on the length of the bar.

According to yet another aspect of the present invention, there is provided a program readable and executable by a computer, for use in an entertainment system having an entertainment apparatus for executing various programs, at least one manual controller for entering manual control requests from the user into the entertainment apparatus, and a display unit for displaying images outputted from the entertainment apparatus, the manual controller having a vibration generating device for imparting vibrations to the user in response to an external request, the program comprising the step of setting up a length of a bar displayed on the display unit according to a control input from the manual controller, and setting up a magnitude of vibrations to be generated by the vibration generating device depending on the length of the bar.

Therefore, magnitudes of vibrations to be generated by the vibration generating device of the manual controller can be set up depending on the length of the bar displayed on the display unit. The user can receive vibrations whose magnitudes have been thus set up at any time the user wants.

If the display unit displays a plurality of bars, then there may be employed vibration output means for, or a step of, imparting vibrations to the user at the magnitude set up by the vibration setting means each time a cursor movable at a constant speed on the display unit is positioned at one of the bars. By changing the lengths of the bars, the user can receive vibrations at different magnitudes as the cursor moves on.

If the manual controller has a plurality of vibration generating devices, and the display unit has means for displaying a plurality of bars which jointly provide a step bar, then the vibration setting means or step may have means for, or a step of, setting up magnitudes of vibrations to be generated by the vibration generating devices depending on the lengths of the bars which jointly provide the step bar. The user can receive different types of vibrations at one step bar.

If the display unit has means for displaying a plurality of step bars, then there may be employed vibration output means for, or a step of, imparting vibrations to the user at the magnitude set up by the vibration setting means each time a cursor movable at a constant speed on the display unit is positioned at one of the step bars. By changing the lengths of the bars of the step bars, the user can receive different types of vibrations at different magnitudes as the cursor moves on.

According to yet still another aspect of the present invention, there is provided an entertainment system comprising an entertainment apparatus for executing various programs, at least one manual controller for entering manual control requests from the user into the entertainment apparatus, a display unit for displaying images outputted from the entertainment apparatus, a sound output unit for outputting sounds outputted from the entertainment apparatus, sound setting means for setting up a length of a bar displayed on the display unit according to a control input from the manual controller, and setting up a type and/or a pitch of sound to be outputted to the sound output unit depending on the length of the bar.

According to a further aspect of the present invention, there is provided an entertainment apparatus for connection to a manual controller for outputting at least a control request from the user, the manual controller having a vibration generating device for imparting vibrations to the user in response to an external request, a display unit for displaying images, and a sound output unit for outputting sounds, comprising sound setting means for setting up a length of a bar displayed on the display unit according to a control input from the manual controller, and setting up a type and/or a pitch of sound to be outputted to the sound output unit depending on the length of the bar.

According to a still further aspect of the present invention, there is provided a recording medium storing a program and data for use in an entertainment system having an entertainment apparatus for executing various programs, at least one manual controller for entering manual control requests from the user into the entertainment apparatus, a display unit for displaying images outputted from the entertainment apparatus, and a sound output unit for outputting sounds outputted from the entertainment apparatus, the program stored in the recording medium comprising the step of setting up a length of a bar displayed on the display unit according to a control input from the manual controller, and setting up a type and/or a pitch of sound to be outputted to the sound output unit depending on the length of the bar.

According to a yet further aspect of the present invention, there is provided a program readable and executable by a computer, for use in an entertainment system having an entertainment apparatus for executing various programs, at least one manual controller for entering manual control requests from the user into the entertainment apparatus, a display unit for displaying images outputted from the entertainment apparatus, and a sound output unit for outputting sounds outputted from the entertainment apparatus, the program comprising the step of setting up a length of a bar displayed on the display unit according to a control input from the manual controller, and setting up a type and/or a pitch of sound to be outputted to the sound output unit depending on the length of the bar.

Therefore, by changing the lengths of the bars, the user can visually set up types of musical instruments and pitches of sounds produced thereby with ease, and can easily compose desired music within a short period of time.

If the display unit (has means for displaying a plurality of bars, then there may be employed sound output means for, or a step of, outputting the type and/or the pitch of sound depending on the length of the bars to the sound output unit each time a cursor movable at a constant speed on the display unit is positioned at one of the bars. By changing the lengths of the bars, sounds of different types of musical instruments and different pitches can be outputted as the cursor moves on.

If the display unit has means for displaying a plurality of bars which jointly provide a step bar, the sound setting means or step may comprise means for, or a step of, setting up the type and/or the pitch of sound to be outputted to the sound output unit depending on the lengths of the bars which jointly provide the step bar. Sounds of different types of musical instruments and different pitches can be outputted at one step bar.

If the display unit has means for displaying a plurality of step bars, then there may be employed sound output means for, or a step of, outputting the type and/or the pitch of sound set up by the sound setting means to the sound output unit each time a cursor movable at a constant speed on the display unit is positioned at one of the step bars. By changing the lengths of the bars of the step bars, sounds of different types of musical instruments and different pitches can be outputted as the cursor moves on.

According to a yet still further aspect of the present invention, there is provided an entertainment system comprising an entertainment apparatus for executing various programs, at least one manual controller for entering manual control requests from the user into the entertainment apparatus, a display unit for displaying images outputted from the entertainment apparatus, a sound output unit for outputting sounds outputted from the entertainment apparatus, the manual controller having a vibration generating device for imparting vibrations to the user in response to an external request, and vibration/sound setting means for setting up a length of a bar displayed on the display unit according to a control input from the manual controller, setting up a magnitude of vibrations to be generated by the vibration generating device depending on the length of the bar, and setting up a type and/or a pitch of sound to be outputted to the sound output unit depending on the length of the bar.

According to another aspect of the present invention, there is provided an entertainment apparatus for connection to a manual controller for outputting at least a control request from the user, the manual controller having a vibration generating device for imparting vibrations to the user in response to an external request, a display unit for displaying images, and a sound output unit for outputting sounds, comprising vibration/sound setting means for setting up a length of a bar displayed on the display unit according to a control input from the manual controller, setting up a magnitude of vibrations to be generated by the vibration generating device depending on the length of the bar, and setting up a type and/or a pitch of sound to be outputted to the sound output unit depending on the length of the bar.

According to still another aspect of the present invention, there is provided a recording medium storing a program and data for use in an entertainment system having an entertainment apparatus for executing various programs, at least one manual controller for entering manual control requests from the user into the entertainment apparatus, a display unit for displaying images outputted from the entertainment apparatus, a sound output unit for outputting sounds outputted from the entertainment apparatus, the manual controller having a vibration generating device for imparting vibrations to the user in response to an external request, the program stored in the recording medium comprising the step of setting up a length of a bar displayed on the display unit according to a control input from the manual controller, setting up a magnitude of vibrations to be generated by the vibration generating device depending on the length of the bar, and setting up a type and/or a pitch of sound to be outputted to the sound output unit depending on the length of the bar.

According to yet another aspect of the present invention, there is provided a program readable and executable by a computer, for use in an entertainment system having an entertainment apparatus for executing various programs, at least one manual controller for entering manual control requests from the user into the entertainment apparatus, a display unit for displaying images outputted from the entertainment apparatus, and a sound output unit for outputting sounds outputted from the entertainment apparatus, the manual controller having a vibration generating device for imparting vibrations to the user in response to an external request, the program comprising the step of setting up a length of a bar displayed on the display unit according to a control input from the manual controller, setting up a magnitude of vibrations to be generated by the vibration generating device depending on the length of the bar, and setting up a type and/or a pitch of sound to be outputted to the sound output unit depending on the length of the bar.

Therefore, the user can set up magnitudes of vibrations to be generated by the vibration generating device of the manual controller, can receive vibrations whose magnitudes have been thus set up at any time the user wants, and can visually set up types of musical instruments and pitches of sounds produced thereby with ease.

If the display unit has means for displaying a plurality of bars, then there may be employed a vibration/sound output means for, or a step of, imparting vibrations to the user at the magnitude set up by the vibration setting means and outputting the type and/or the pitch of sound depending on the length of the bars to the sound output unit each time a cursor movable at a constant speed on the display unit is positioned at one of the bars. By changing the lengths of the bars, the user can receive vibrations at different magnitudes, and sounds of different types of musical instruments and different pitches can be outputted as the cursor moves on.

If the manual controller has a plurality of vibration generating devices, and the display unit has means for displaying a plurality of bars which jointly provide a step bar, then the vibration/sound setting means or step may comprise means for, or a step of, setting up magnitudes of vibrations to be generated by the vibration generating devices and setting up the type and/or the pitch of sound to be outputted to the sound output unit depending on the lengths of the bars which jointly provide the step bar. The user can receive different types of vibrations at one step bar, and sounds of different types of musical instruments and different pitches can be outputted at one step bar.

If the display unit has means for displaying a plurality of step bars, then there may be employed vibration/sound output means for, or a step of, imparting vibrations to the user at the magnitude set up by the vibration setting means and outputting the type and/or the pitch of sound set up by the sound setting means to the sound output unit each time a cursor movable at a constant speed on the display unit is positioned at one of the step bars. By changing the lengths of the bars of the step bars, the user can receive different types of vibrations at different magnitudes as the cursor moves on, and sounds of different types of musical instruments and different pitches can be outputted as the cursor moves on.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 20 is a diagram showing details of a percussion instrument information table;

FIG. 21 is a diagram showing details of a pitch information table;

DESCRIPTION OF THE PREFERRED EMBODIMENT

An entertainment system according to the present invention as applied to a video game apparatus, and a recording medium according to the present invention as applied to a recording medium which stores a program and data executed by the video game apparatus will be described below with reference to FIGS. 1 through 37.

Figure 1:
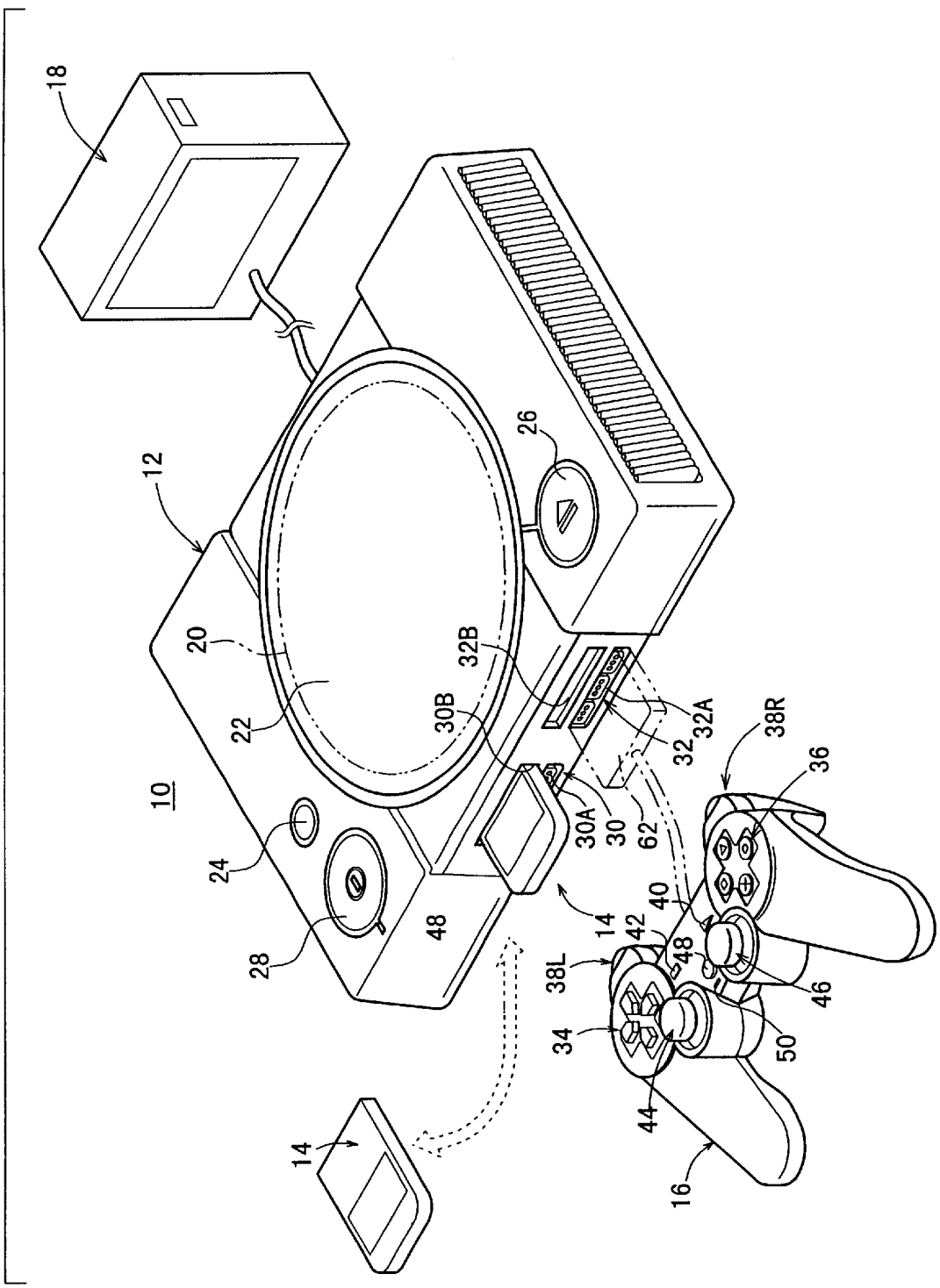
FIG. 1 is a perspective view of an entertainment system according to the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a monitor 18 such as a television receiver which is supplied with video and audio signals from the entertainment apparatus 12.

The entertainment apparatus 12 reads a program recorded in a mass storage medium such as an optical disk 20 such as a CD-ROM or the like, and executes a game, for example, based on the program depending on commands supplied from the user, e.g., the game player, via the manual controller 16. The execution of the game mainly represents controlling the progress of the game by controlling the display of images and the generation of sounds on the monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 may be connected respectively to the lower slots units 30A, 32A, and memory cards 14 for storing flags indicative of interim game data and portable information terminals (not shown) also functioning as memory cards may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

The manual controller 16 has first and second control pads 34, 36, an L button 38L, an R button 38R, a start button 40, and a selection button 42. The manual controller 16 also has left and right joysticks 44, 46 for making analog control actions, a mode selection switch 48 for selecting control modes of the joysticks 44, 46, and an indicator 50 for indicating a selected control mode. The indicator 50 comprises a light-emitting element such as a photodiode or the like.

Figure 2:
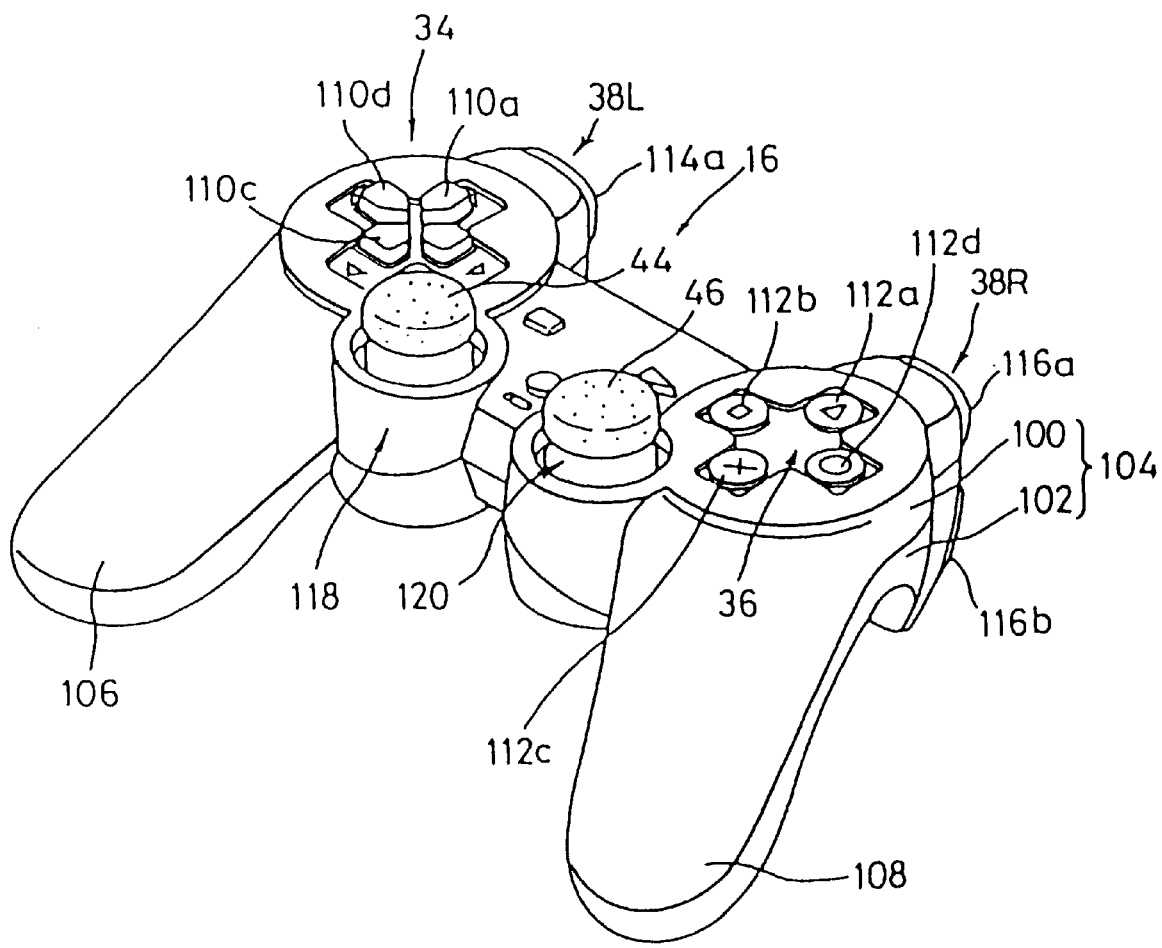
FIG. 2 is a perspective view of a manual controller.

As shown in FIG. 2, the manual controller 16 has a housing 104 comprising an upper member 100 and a lower member 102 which are mated and joined to each other by fasteners such as screws.

Figure 3:
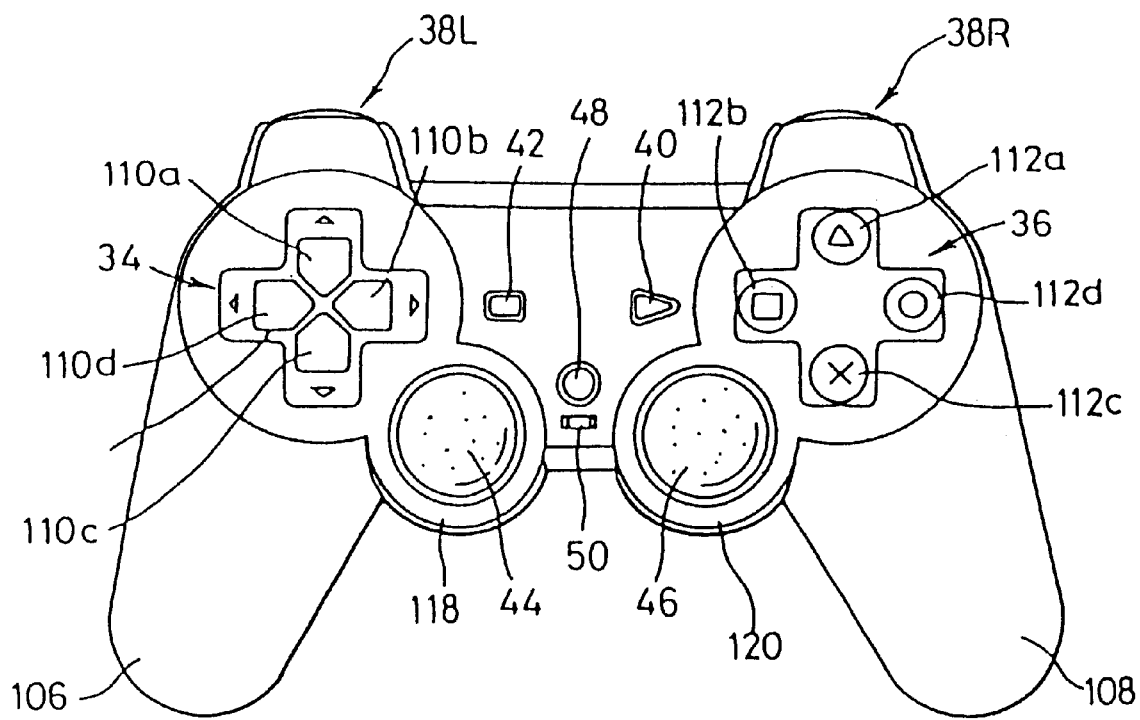
FIG. 3 is a plan view of the manual controller.

As shown in FIGS. 2 and 3, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the left and right grips 106, 108 are progressively spaced away from each other toward their distal ends. To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises four pressable control members 110a, 110b, 110c, 110d, i.e., an upward control member 110a, a rightward control member 110b, a downward control member 110c, and a leftward control member 110d. The pressable control members 110a, 110b, 110c, 110d project on an upper surface of the housing 104 and are arranged in a crisscross pattern.

The first control pad 34 includes switch elements as signal input elements associated respectively with the pressable control members 110a, 110b, 110c, 110d. The first control pad 34 functions as a directional controller for controlling the direction of movement of a displayed game character, for example. When the game player selectively presses the pressable control members 110a, 110b, 110c, 110d to turn on or off the switch elements associated respectively with the pressable control members 110a, 110b, 110c, 110d, the displayed game character moves in the direction corresponding to the pressed one of the pressable control members 110a, 110b, 110c, 110d.

As shown in FIGS. 2 and 3, the second control pad 38 is disposed on the other end of the housing 104 and comprises four pressable control members 112a, 112b, 112c, 112d. The pressable control members 112a, 112b, 112c, 112d project on the upper surface of the housing 104 and are arranged in a crisscross pattern. The control member 112a is marked with a symbol "Δ", the control member 112b with a symbol "□", the control member 112c with a symbol "x", and the control member 112d with a symbol "○". The control member 112d marked with the symbol "○" serves as a decision key 112d.

The pressable control members 112a, 112b, 112c, 112d are constructed as independent members, and associated with respective switch elements disposed in the second control pad 36. The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
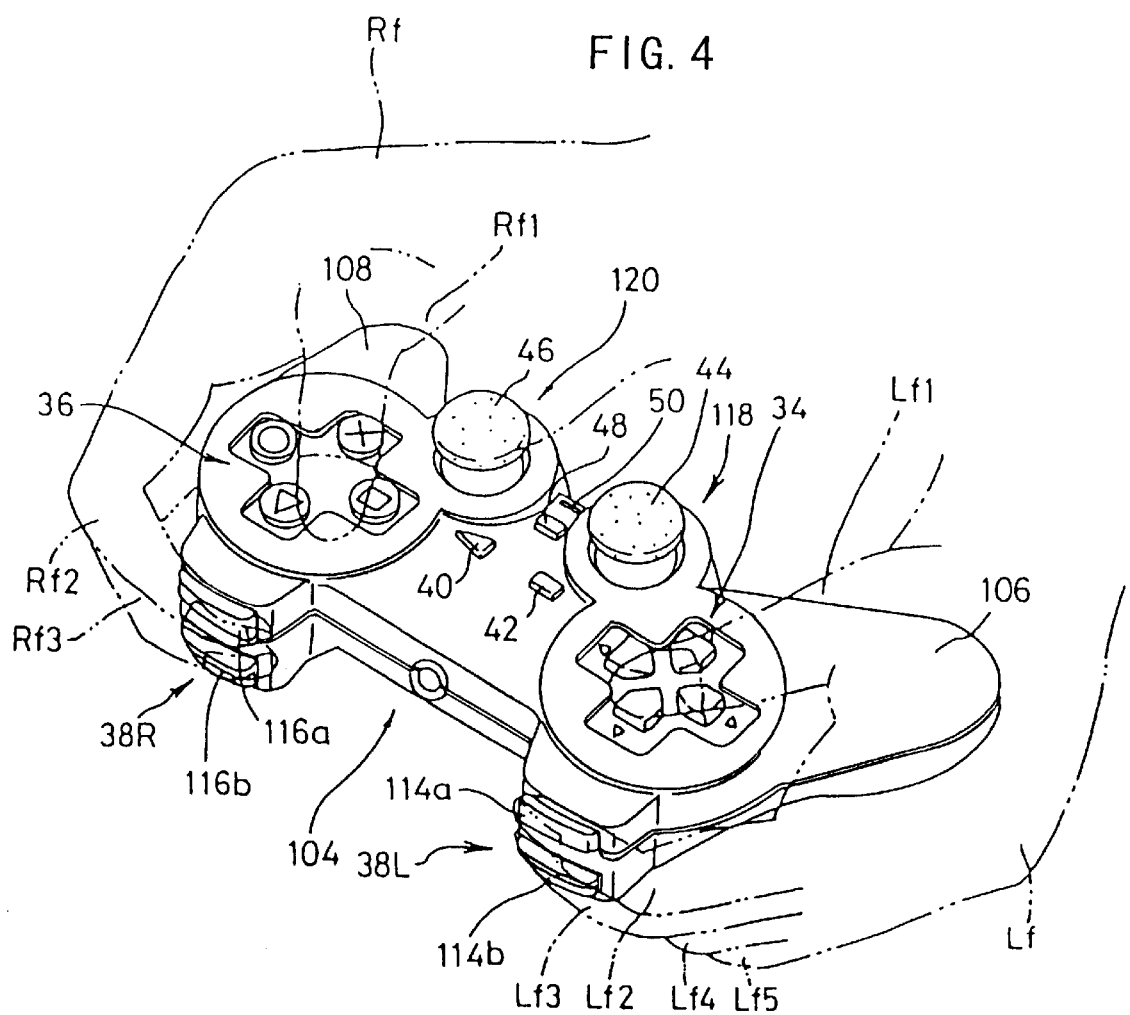
FIG. 4 is a perspective view showing the manner in which the manual controller is used.

The L button 38L and the R button 38R are disposed on a side of the housing 104 remote from the first and second grips 106, 108 and positioned respectively at the opposite ends of the housing 104. As shown in FIGS. 2 and 4, the L button 38L and the R button 38R have respective left first and left second pressable control members (L1 key, L2 key) 114a, 114b and right first and right second pressable control members (R1 key, R2 key) 116a, 116b and respective switch elements associated respectively with the pressable control members 114a, 114b and 116a, 116b.

The L button 38L and the R button 38R serve as respective function setting/performing units for setting functions for a displayed game character assigned to the L1 key 114a, the L2 key 114b, the R1 key 116a, and the R2 key 116b or performing functions of a displayed game character when the switch elements associated with the L1 key 114a, the L2 key 114b, the R1 key 116a, and the R2 key 116b are turned on.

As shown in FIGS. 2 and 3, the manual controller 16 also has left and right analog control pads 118, 120 disposed respectively at confronting corners defined between the housing 104 and the proximal ends of the left and right grips 106, 108 which are joined to the housing 104.

The left and right analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the left and right joysticks 44, 46 are mounted on tip ends of the control shafts that are normally urged to return to their neutral positions by biasing members, and can be tilted in all directions (360°) about the axes of the control shafts.

The left and right analog control pads 118, 120 can move a displayed game character while rotating the same or while changing its speed, and can make an analog-like action such as to change the form of a displayed character, when the game player rotates the left and right joysticks 44, 46. Therefore, the left and right analog control pads 118, 120 are used as a control unit for entering command signals for a displayed character to perform the above movement or action.

When the mode selection switch 48 is pressed, it can select a control mode for allowing a command signal to be inputted from the left and right analog control pads 118, 120 or a control mode for inhibiting a command signal from being inputted from the left and right analog control pads 118, 120.

When the mode selection switch 48 is pressed, it can also select a control mode for allowing a command signal to be inputted from the left and right analog control pads 118, 120 and selecting the function of the pressable control members 112a, 112b, 112c, 112d of the second control pad 42 or the function of the L1 key 114a, the L2 key 114b, the R1 key 116a, and the R2 key 116b of the L button 38L and the R button 38R. Depending on the control mode selected by the mode selection switch 48, the mode indicator 50 flickers and changes its indication light.

As shown in FIG. 4, the left and right grips 106, 108 projecting from the housing 104 are gripped respectively by the palms of the hands of the game player. The housing 104 is not required to be supported by fingers, and the manual controller 16 can be held by the hands while all of, or at least six out of, the ten fingers of the hands can freely be moved.

As shown in FIG. 4, when the left and right grips 106, 108 are gripped respectively by the palms of the hands of the game player, the thumbs Rf1, Lf1 of the right and left hands can extend over the left and right joysticks 44 of the left and right analog control pads 118, 120, the pressable control members 110a–110d of the first control pad 34, and the pressable control members 112a–112d of the second control pad 36, and can selectively press the left and right joysticks 44, 46, the pressable control members 110a–110d, and the pressable control members 112a–112d.

Since the left and right joysticks 44, 46 of the left and right analog control pads 118, 120 are positioned in confronting relation to the proximal ends of the left and right grips 106, 108 which are joined to the housing 104, when the left and right grips 106, 108 are gripped by the left and right hands, the left and right joysticks 44, 46 are positioned most closely to the thumbs Rf1, Lf1, respectively. Therefore, the left and right joysticks 44, 46 can easily be rotated by the thumbs Rf1, Lf1.

As shown in FIG. 4, when the left and right grips 106, 108 are gripped respectively by the palms of the hands of the game player, the index fingers Rf2, Lf2 and middle fingers Rf3, Lf3 of the right and left hands can extend over positions where they can selectively press the L1 key 114a, the L2 key 114b, the R1 key 116a, and the R2 key 116b of the R button 38R and the L button 38L.

Figure 5:
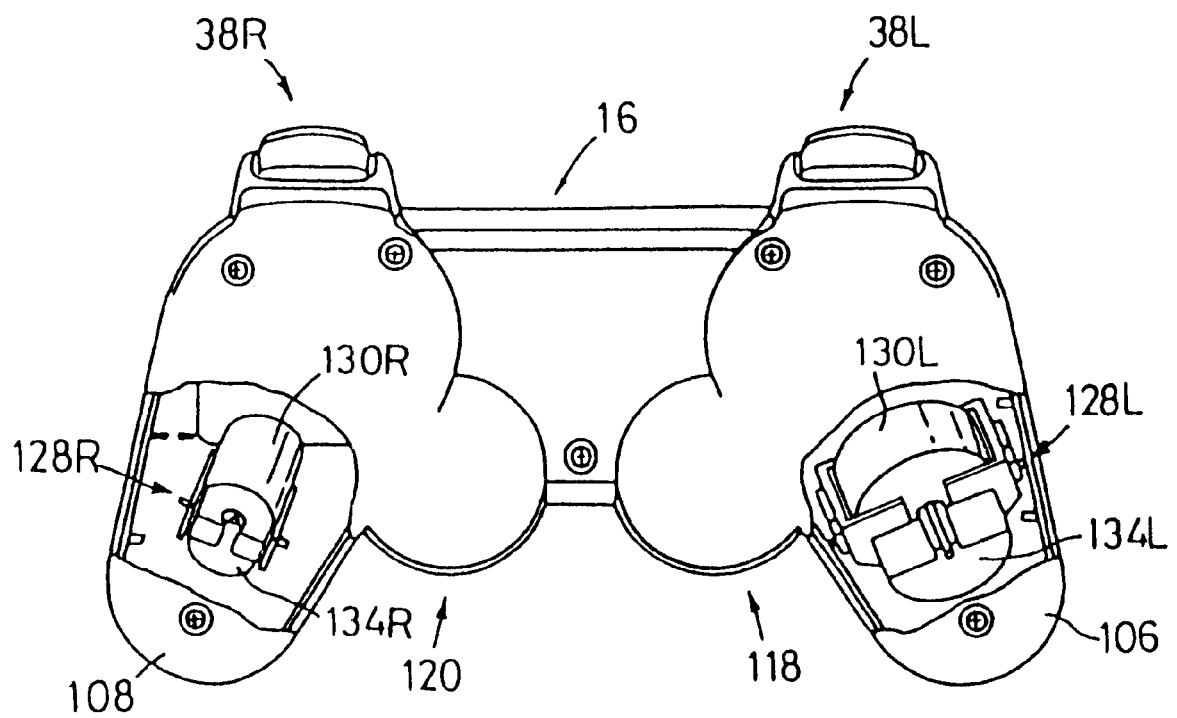
FIG. 5 is a bottom view, partly broken away, of the manual controller, showing vibration imparting mechanisms disposed respectively in left and right grips.

As shown in FIG. 5, the manual controller 16 has a pair of right and left vibration imparting mechanisms 128R, 128L for imparting vibrations to the user in order for the user to be able to play a highly realistic game.

As shown in FIG. 5, the vibration imparting mechanisms 128R, 128L are positioned near the proximal ends of the left and right grips 106, 108 that are held by the hands and fingers when the manual controller 16 is gripped by the user.

Figure 6:
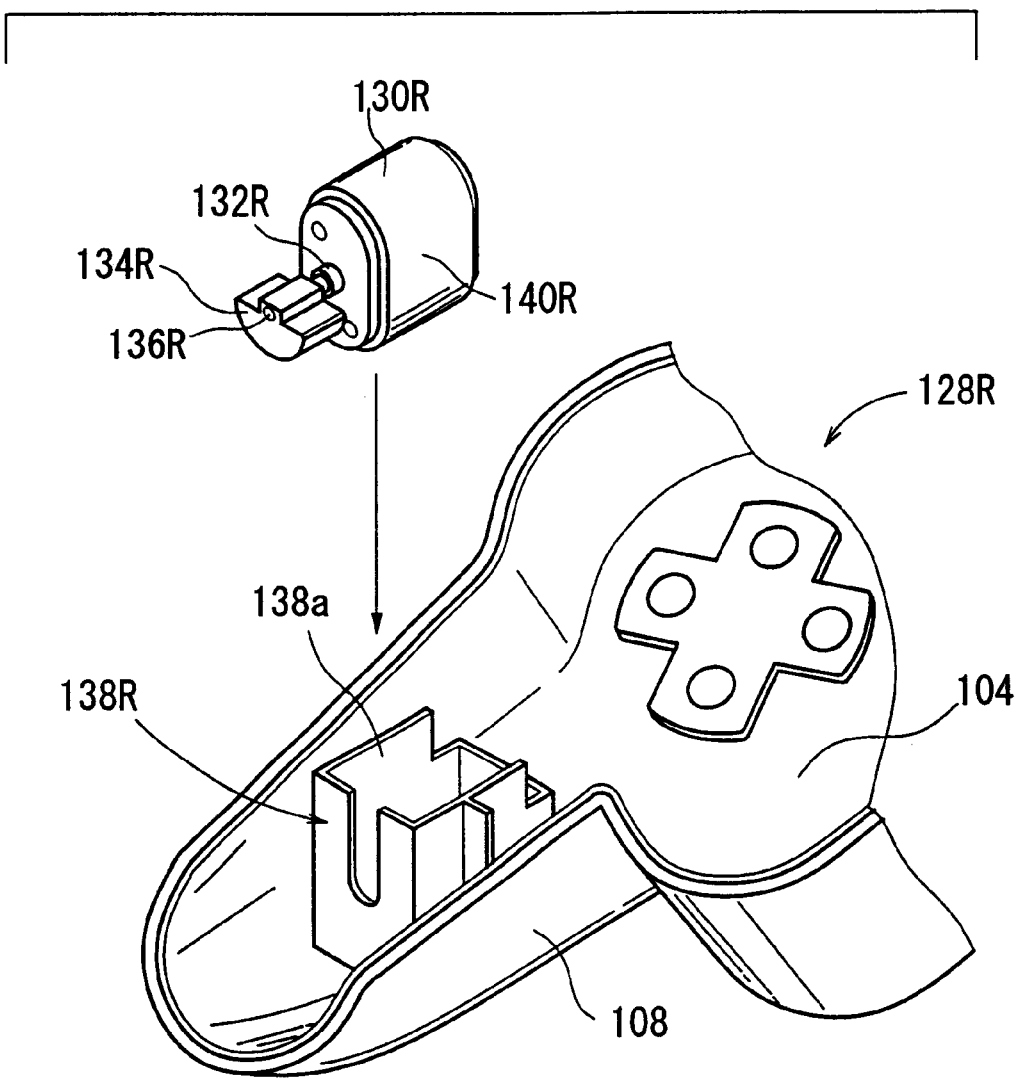
FIG. 6 is a fragmentary exploded perspective view of the manual controller, showing one of the vibration imparting mechanisms.

The vibration imparting mechanisms 128R, 128L are of an identical structure. The right vibration imparting mechanism 128R will be described as a representative vibration imparting mechanism. As shown in FIG. 6, the vibration imparting mechanism 128R comprises a motor 130R energizable by a vibration generating command supplied from the entertainment apparatus 12, and an eccentric member 134R mounted eccentrically on the drive shaft 132R of the motor 130R.

The eccentric member 134R comprises a weight in the form of a heavy metal member having a semicircular cross-sectional shape. The weight has an off-center hole defined therein in which the drive shaft 132R of the motor 130R is fitted.

Figure 7:
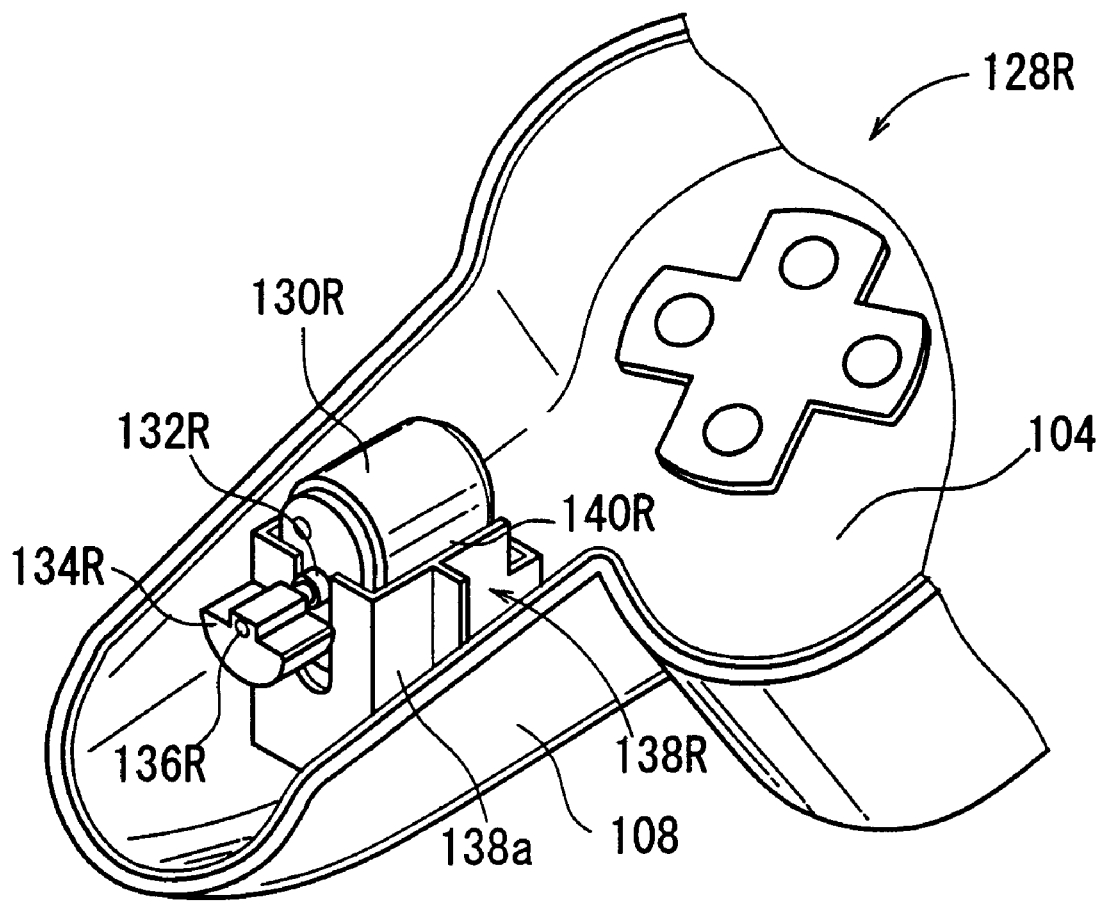
FIG. 7 is a fragmentary perspective view of the manual controller with the vibration imparting mechanism installed therein.

The motor 130R with the eccentric member 134R has a motor housing 140R fitted in a recess 138R defined by a rectangular tubular peripheral wall 138a disposed within the left grip 106, as shown in FIG. 7.

When the motor 130 is energized, the drive shaft 132R thereof rotates to cause the eccentric member 134R to rotate in an eccentric motion for thereby producing vibrations, which are imparted to the motor 130R. The vibrations of the motor 130R are then transmitted to the left grip 106 via the peripheral wall 138a, from which the vibrations are applied to the hand and fingers that grip the left grip 106.

The vibration imparting mechanisms 128R, 128L disposed respectively in the left and right grips 106, 108 are arranged to impart vibrations in different modes. For example, the motor 130L of the left vibration imparting mechanism 128L is larger than the motor 130R of the right vibration imparting mechanism 128R. The rotational speed of the drive shaft of the motor 130L varies depending on a vibrational value $V_L$ contained in a vibration generation command sent from the entertainment apparatus 12, and hence the frequency of vibrations generated by the motor 130L varies depending on the vibrational value $V_L$. In the illustrated embodiment, the frequency of vibrations increases in proportion to the vibrational value $V_L$.

The motor 130R of the right vibration imparting mechanism 128R is either energized or de-energized depending on a logic value "1" or "0" of a vibrational value $V_R$ contained in the vibration generation command. Unlike the vibration imparting mechanism 128R, the vibration imparting mechanism 128L produces vibrations or does not produce vibrations.

In order to energize the motors 130R, 130L to vibrate the manual controller 16 in its entirety, a bidirectional communication function needs to be provided between the manual controller 16 and the entertainment apparatus 12. This bidirectional communication function will be described later on.

Circuit arrangements of the entertainment apparatus 12 and the manual controller 16 will be described below with reference to FIGS. 8 through 10.

Figure 8:
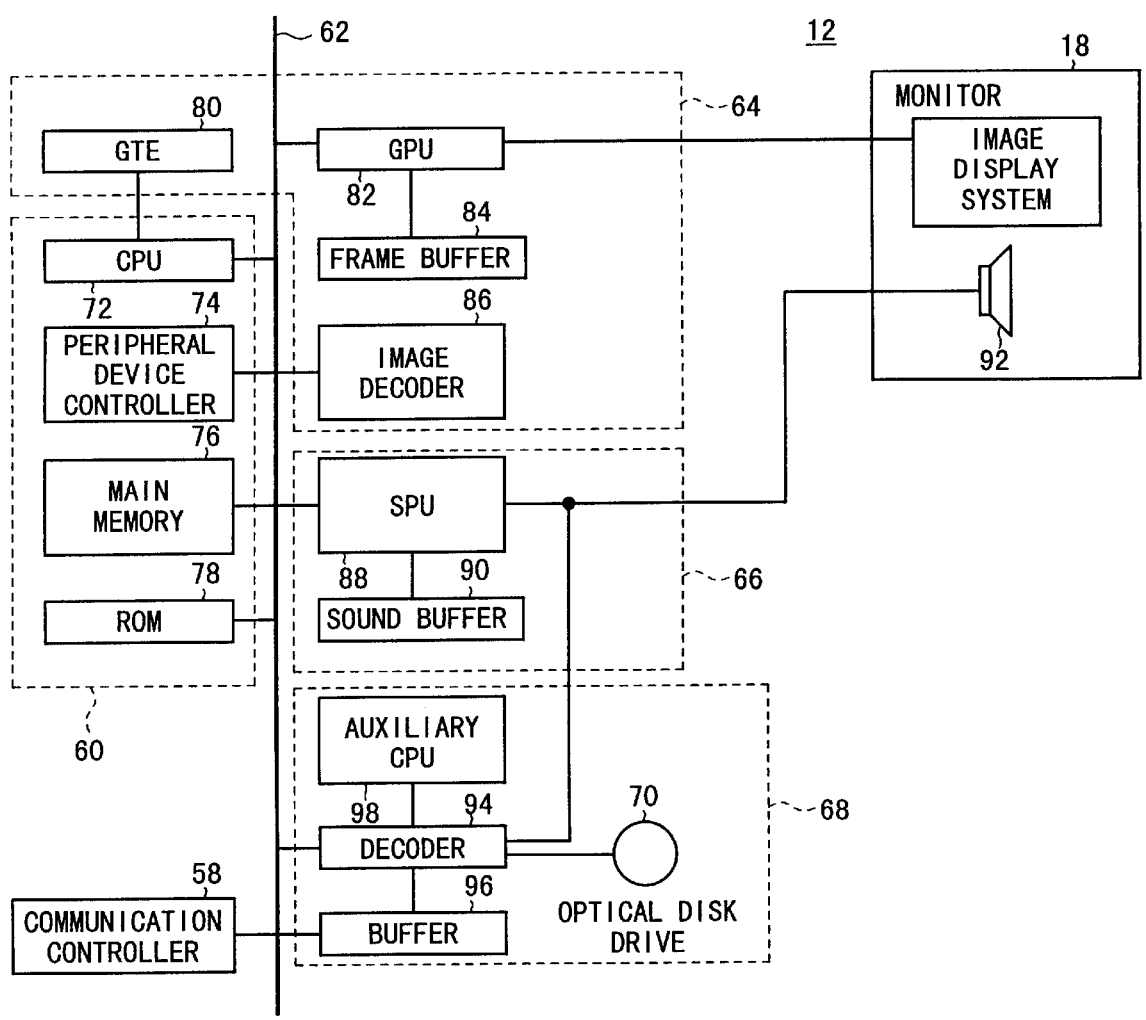
FIG. 8 is a block diagram of a circuit arrangement of the entertainment apparatus.

As shown in FIG. 8, the entertainment apparatus 12 generally comprises a control system 60, a graphic generating system 64 connected to the control system 60 via a system bus 62, a sound generating system 66 connected to the control system 60 via the system bus 62, and an optical disk control system 68 connected to the control system 60 via the system bus 62. A communication controller 58 for controlling data to be inputted to and outputted from the manual controller 16 and the memory card 14 is also connected to the control system 60 via the system bus 62.

The manual controller 16 supplies commands (including control data) from the user via a communication controller 150 (see FIG. 9) of the manual controller 16 and the communication controller 58 to the entertainment apparatus 12. The optical disk control system 68 includes an optical disk drive 70 in which the optical disk 20, which may comprise a CD-ROM or the like as a specific example of a recording medium according to the present invention.

The control system 60 controls motions of characters displayed on the monitor 18 based on a program and data read from the optical disk 20 and commands supplied from the manual controller 16.

The control system 60 includes a central processing unit (CPU) 72, a peripheral device controller 74 for controlling interrupts and direct memory access (DMA) data transfer, a main memory 76 comprising a random-access memory (RAM), and a read-only memory (ROM) 78 which stores various programs such as an operating system for managing the graphic generating system 64, the sound generating system 66, etc. The main memory 76 can store at least a game program that is supplied from the optical disk 20 and executed by the central processing unit 72.

The CPU 72 controls the entertainment apparatus 12 in its entirety by executing the operating system stored in the ROM 78. The CPU 72 comprises a 32-bit RISC-CPU, for example.

When the entertainment apparatus 12 is turned on, the CPU 72 executes the operating system stored in the ROM 78 to start controlling the graphic generating system 64, the sound generating system 66, etc.

When the operating system is executed, the CPU 72 initializes the entertainment apparatus 12 in its entirety for checking its operation, and thereafter controls the optical disc control system 68 to execute an application program such as a game program recorded in the optical disk 20.

As the application program such as a game program is executed, the CPU 72 controls the graphic generating system 64, the sound generating system 66, etc. depending on commands entered from the user for thereby controlling the display of images and the generation of music sounds and sound effects.

The graphic generating system 64 comprises a geometry transfer engine (GTE) 80 for performing coordinate transformations and other processing, a graphic processing unit (GPU) 82 for rendering image data according to instructions from the CPU 72, a frame buffer 84 for storing image data rendered by the GPU 82, and an image decoder 86 for decoding image data compressed and encoded by an orthogonal transform such as a discrete cosine transform.

The GTE 80 has a parallel arithmetic mechanism for performing a plurality of arithmetic operations parallel to each other, and can perform coordinate transformations and light source calculations, and calculate matrixes or vectors at a high speed in response to a request from the CPU 72.

Specifically, the GTE 80 can calculate the coordinates of a maximum of 1.5 million polygons per second for a flat shading process to plot one triangular polygon with one color, for example. With the GTE 80, the entertainment apparatus 12 is able to reduce the burden on the CPU 72 and perform high-speed coordinate calculations.

According to an image generating instruction from the CPU 72, the GPU 82 generates and stores the data of a polygon or the like in the frame buffer 84. The GPU 82 is capable of generating and storing a maximum of 360 thousand polygons per second.

The frame buffer 84 comprises a dual-port RAM, and is capable of simultaneously storing image data generated by the GPU 82 or image data transferred from the main memory 86, and reading image data for display. The frame buffer 84 has a storage capacity of 1 Mbytes, for example, and is handled as a 16-bit matrix made up of a horizontal row of 1024 pixels and a vertical column of 512 pixels.

The frame buffer 84 has a display area for storing image data to be outputted as video output data, a CLUT (color look-up table) area for storing a color look-up table which will be referred to by the GPU 82 when it renders a polygon or the like, and a texture area for storing texture data to be subjected to coordinate transformations when a polygon is generated and mapped onto a polygon generated by the GPU 82. The CLUT area and the texture area are dynamically varied as the display area is varied.

The GPU 82 can perform, in addition to the flat shading process, a Gouraud shading process for determining colors in polygons by interpolating intensities from the vertices of the polygons, and a texture mapping process for mapping textures stored in the texture area onto polygons. For performing the Gouraud shading process or texture mapping process, the GTE 80 can perform coordinate calculations for a maximum of about 500,000 polygons per second.

The image decoder 86 is controlled by the CPU 72 to decode image data of a still or moving image stored in the main memory 76, and store the decoded image into the main memory 76.

Image data reproduced by the image decoder 86 is transferred to the frame buffer 84 by the GPU 82, and can be used as a background for an image plotted by the GPU 82.

The sound generating system 66 comprises a sound processing unit (SPU) 88 for generating music sounds, sound effects, etc. based on instructions from the CPU 72, and a sound buffer 90 for storing music sounds, sound effects, etc. generated by the SPU 88. Audio signals representing music sounds, sound effects, etc. generated by the SPU 88 are supplied to audio terminals of the monitor 18. The monitor 18 has a speaker 92 which radiates music sounds, sound effects, etc. generated by the SPU 88 based on the supplied audio signals.

The SPU 88 has an ADPCM (adaptive differential PCM) function for reproducing 16-bit sound data which has been encoded as 4-bit differential sound data by ADPCM, a reproducing function for reproducing waveform data stored in the sound buffer 90 to generate sound effects, etc., and a modulating function for modulating and reproducing the waveform data stored in the sound buffer 90.

The sound system 66 with these functions can be used as a sampling sound source which generates music sounds, sound effects, etc. based on the waveform data stored in the sound buffer 90 according to instructions from the CPU 72.

The optical disk control system 68 comprises an optical disk drive 70 for reproducing application programs and data recorded on the optical disk 20, a decoder 94 for decoding programs and data that are recorded with an error correcting code added thereto, and a buffer 96 for temporarily storing data read from the optical disk drive 70 so as to allow the data from the optical disk 20 to be read at a high speed. An auxiliary CPU 98 is connected to the decoder 94.

Sound data recorded on the optical disk 20 which is read by the optical disk drive 70 includes PCM data converted from analog sound signals, in addition to the ADPCM data.

The ADPCM data, which is recorded as 4-bit differential data of 16-bit digital data, is decoded by the decoder 94, supplied to the SPU 88, converted thereby into analog data, and applied to drive the speaker 92.

The PCM data, which is recorded as 16-bit digital data, is decoded by the decoder 94 and then applied to drive the speaker 92.

Figure 9:
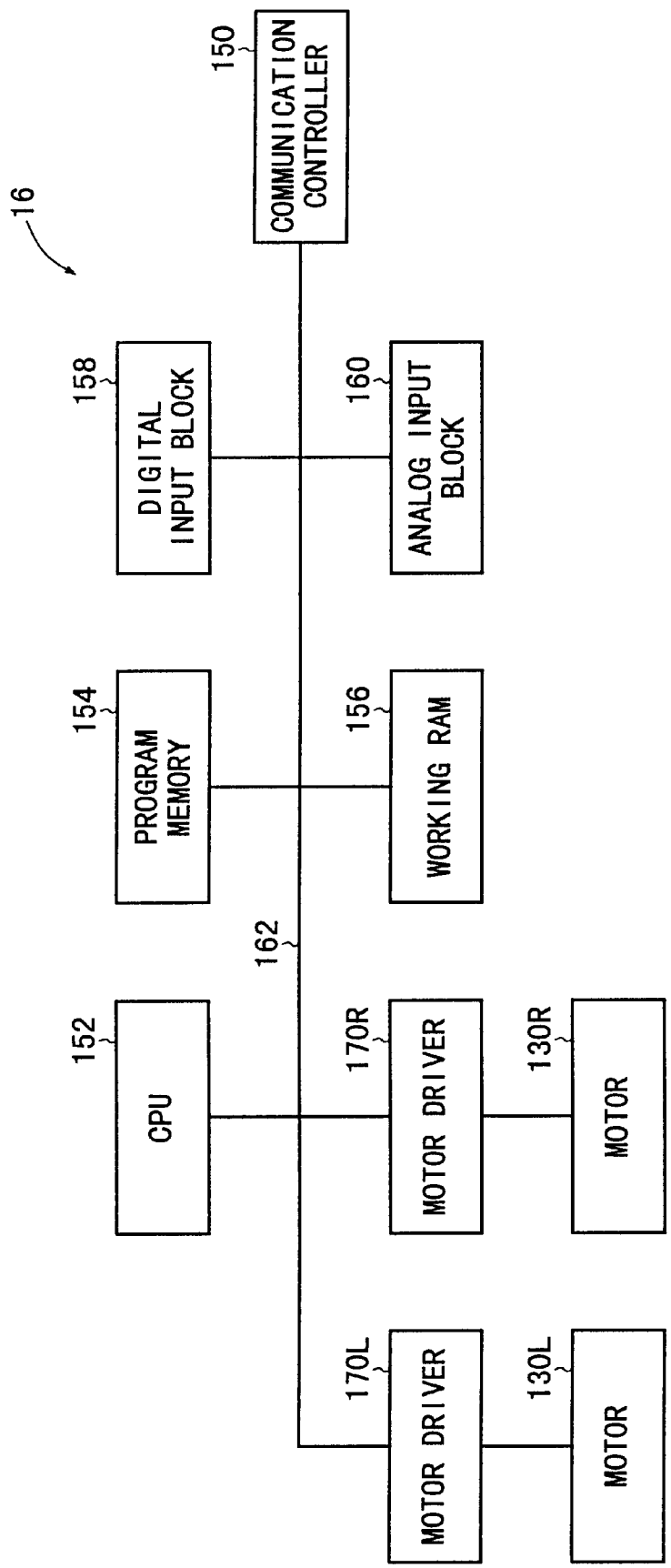
FIG. 9 is a block diagram of the manual controller.

As shown in FIG. 9, the manual controller 16 comprises a communication controller 150, a CPU 152, a program memory 154, a working RAM 156, a digital input block 158, an analog input block 160, a left motor driver 170L for energizing the left motor 130L, and a right motor driver 170R for energizing the right motor 130R. These components of the communication controller 16 are connected to a bus 162.

The digital input block 158 functions as a manual input controller for the pressable control members 110a–110d of the first control pad 34 and the pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 58 (see FIG. 8) of the entertainment apparatus 12, for example, for data communications with the entertainment apparatus 12.

Figure 10:
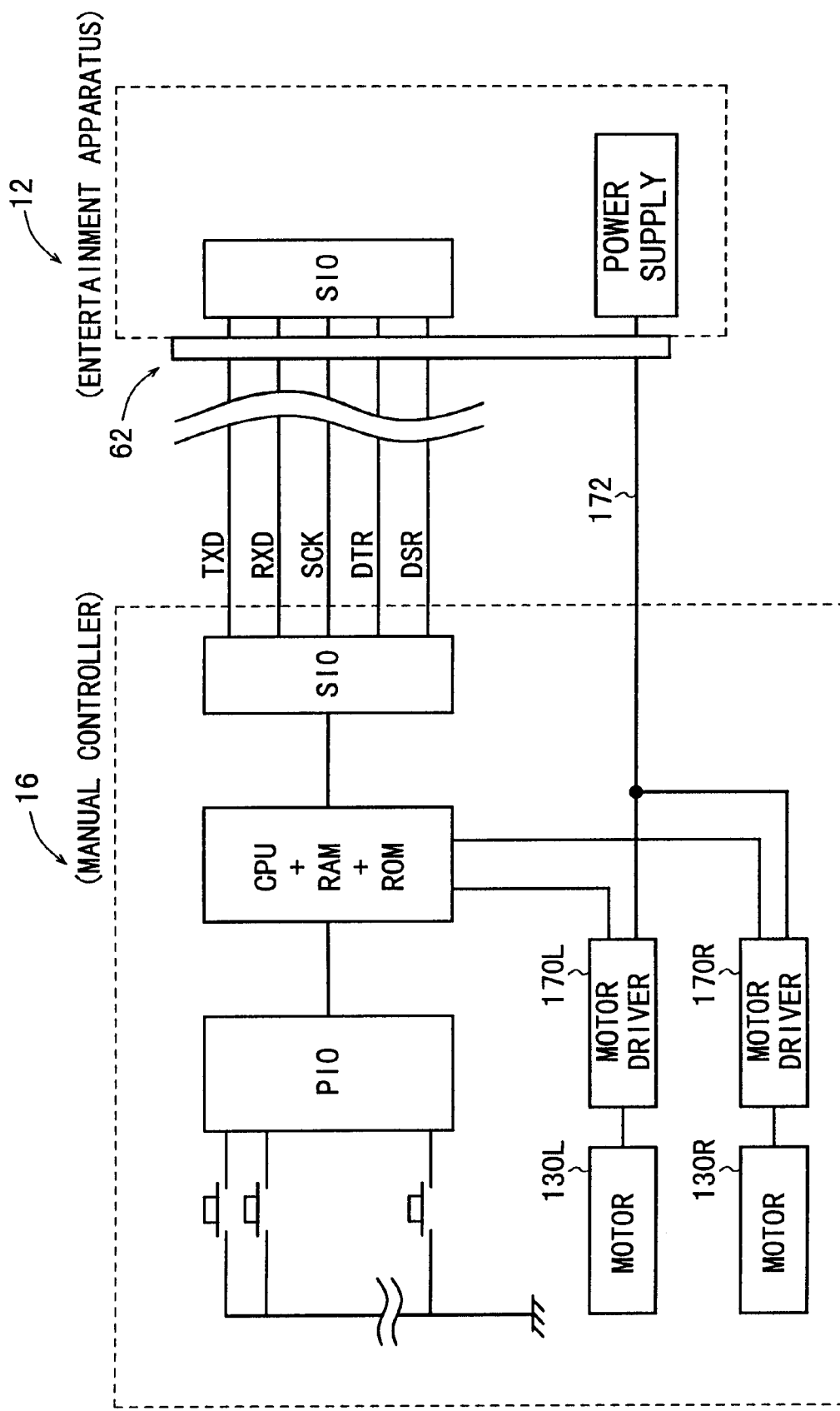
FIG. 10 is a block diagram of components for carrying out bidirectional serial communications between the manual controller and the entertainment apparatus.

As shown in FIG. 10, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering control data from a plurality of control buttons, a one-chip microcomputer comprising a CPU, a RAM, and a ROM, and a pair of motor drivers 170R, 170L for energizing the motors 130R, 130L of the vibration imparting mechanisms 128R, 128L. Each of the motors 130R, 130L is energized by a voltage and a current supplied from the motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the entertainment apparatus 12 and the manual controller 16. Other detailed structure of the entertainment apparatus 12 are omitted from illustration in FIG. 10.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. This cable further includes a power line 172 extending from a power supply in the entertainment apparatus 12 and connected to the motor drivers 170R, 170L in the manual controller 16 for supply electric energy to energize the motors 130R, 130L.

A process of bidirectional serial communication between the entertainment apparatus 12 and the manual controller 16 will be described below. In order for the entertainment apparatus 12 to communicate with the manual controller 16 to read manipulation data from the digital input block 158 and the analog input block 160, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends control data via the data transfer signal line TXD to the manual controller 16, which sends manipulation data from the digital input block 158 and the analog input block 160 via the data transfer signal line RXD to the entertainment apparatus 12. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly control data from the digital input block 158 and the analog input block 160 to the entertainment apparatus 12, and the entertainment apparatus 12 can send vibration generating commands for energizing the motors 130R, 130L of the vibration imparting mechanisms 128R, 128L via the data transfer signal line TXD to the manual controller 16.

The vibration generating commands for energizing the motors 130R, 130L include those which have been established in advance in the optical disk 20 set in the entertainment apparatus 12 and those which are newly generated in the entertainment apparatus 12.

Characteristic functions of the entertainment system 10 according to the present embodiment will be described below with reference to FIGS. 11 through 37.

The characteristic functions include a vibration/sound setting function for setting up lengths of bars displayed on the monitor 18 according to control entries from the manual controller 16 thereby to set up magnitudes of vibrations to be generated by the vibration imparting mechanisms 128R, 128L in the manual controller 16 depending on the lengths of the displayed bars, and to set up types and/or pitches of sound data to be outputted to the speaker 92 of the monitor 18 depending on the lengths of the displayed bars, and an output function for giving vibrations at a magnitude set up by the vibration/sound setting function to the user and outputting the type and/or pitch of sound data to the speaker 92 depending on the length of a displayed bar each time a cursor that is movable at a constant speed on the monitor 18 is positioned on the bar.

It is assumed in the present embodiment that the types of sound data represent the types of percussion instruments, and the pitches represent bass pitches.

Figure 11:
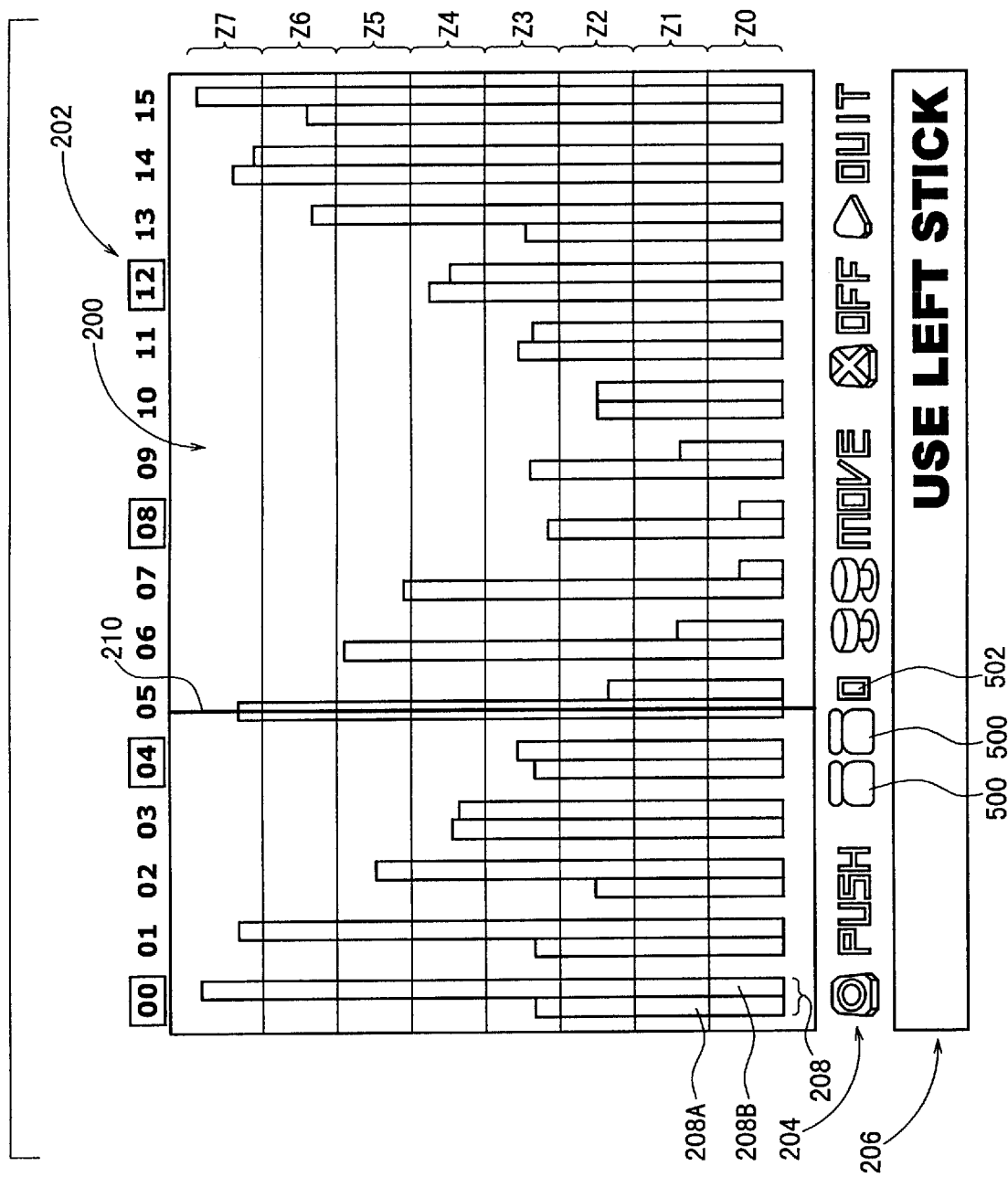
FIG. 11 is a view showing a displayed image for making settings.

FIG. 11 shows a displayed image on the monitor 18 for making settings. As shown in FIG. 11, the displayed image includes a bar displaying/setting area 200 displaying eight vertically spaced horizontal lines, a step number displaying area 202 disposed above the bar displaying/setting area 200 and displaying numbers (00–15) representative of steps for displaying and setting bars, an icon displaying area 204 disposed below the step number displaying area 202 and displaying control icons and guidance for operating the control icons, and a message displaying area 206 disposed below the icon displaying area 204 and displaying a message of the guidance in a left scrolling action.

The bar displaying/setting area 200 displays a plurality of vertical bars (step bars) 208 respectively at 16 steps. The step bar 208 at each of the 16 steps includes a left bar or first bar 208A that is used to set up a magnitude of vibrations to be generated by the vibration imparting mechanism 128L and a type of percussion instrument, and a right bar or second bar 208B that is used to set up a magnitude of vibrations to be generated by the vibration imparting mechanism 128R and a bass pitch.

The bar displaying/setting area 200 also displays a vertical linear cursor 210 that is movable horizontally. When the cursor 210 is positioned at one of the steps, the user can set up lengths of the first and second bars 208A, 208B at that step. Specifically, the cursor 210 moves horizontally when the user moves the left joystick 44 to the left or right or the user presses the control member 110$d$ or 110$b$ (see FIG. 3) of the first control pad 34.

The length of the first bar 208A can be set to a desired value when the user moves the left joystick 44 vertically, and the length of the second bar 208B can be set to a desired value when the user moves the right joystick 46 vertically.

Figure 12:
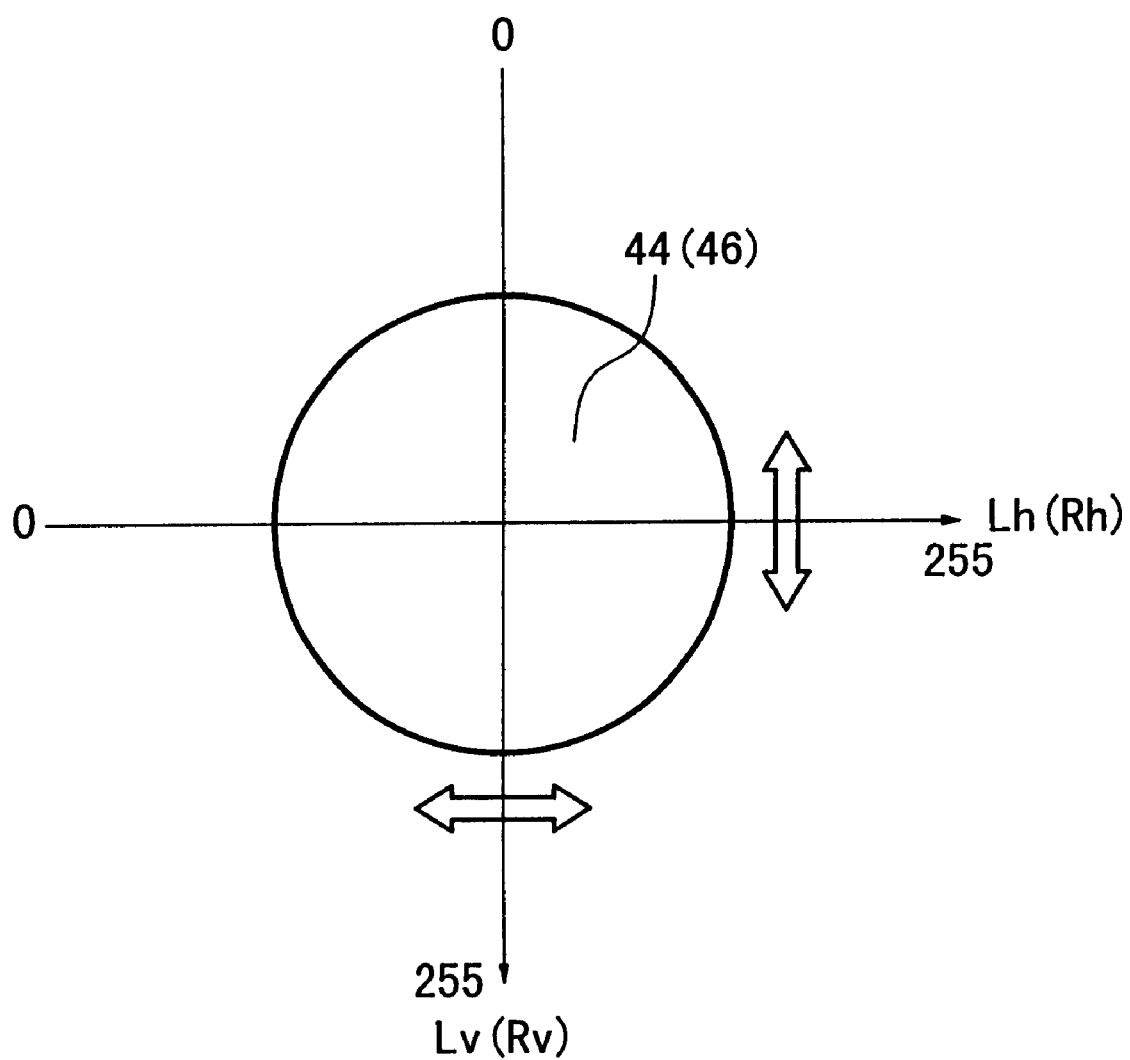
FIG. 12 is a diagram showing a vertical value and a horizontal value achieved when a left or right joystick is tilted.

As shown in FIG. 12, analog input values produced when the user moves the left and right joysticks 44, 46 are available in a vertical range from an uppermost vertical value Lv, Rv of "0" to a lowermost vertical value Lv, Rv of "255" and a horizontal range from a leftmost horizontal value Lh, Rh of "0" to a rightmost horizontal value Lh, Rh of "255".

According to the vibration/sound setting function, the frequency of vibrations generated by the left vibration imparting mechanism 128L increases in proportion to the length of the first bar 208A, and the right vibration imparting mechanism 128R generates or stops vibrations depending on whether the second bar 208B is present or not.

According to the vibration/sound setting function, the bar displaying/setting area 200 is divided into eight horizontal strips Z0–Z7 by the displayed eight vertically spaced horizontal lines. Eight percussion instruments and eight pitches are defined respectively by the eight horizontal strips Z0–Z7. A percussion instrument corresponding to the strip where the upper end of the first bar 208A is positioned is selected, and a pitch corresponding to the strip where the upper end of the second bar 208B is positioned is selected.

The displayed image for making settings can selectively switch to four setting images in response to the pressing of the L1 key 114$a$ and the L2 key 114$b$ of the L button 38L, and the R1 key 116$a$ and the R2 key 116$b$ of the R button 38R. A number 502 indicating the present setting image is displayed on the right side of the icons 500 of the L button 38L and the R button 38R.

When the decision key 112$d$ of the second control pad 36 is pressed, the cursor 210 moves to the right at a constant speed. Each time the cursor 210 is positioned at a step bar 208, the manual controller 16 gives vibrations depending on the lengths of the first and second bars 208A, 208B of the step bar 208 to the user, and at the same time, the speaker 92 of the monitor 18 outputs the sound of a selected percussion instrument and the sound of bass at a selected pitch.

Therefore, the vibration/sound setting function and the output function allow the user to feel the magnitude of vibrations that the user has set up and also allow the user to enjoy the entertainment system 10 as a rhythm producing machine.

Figure 13:
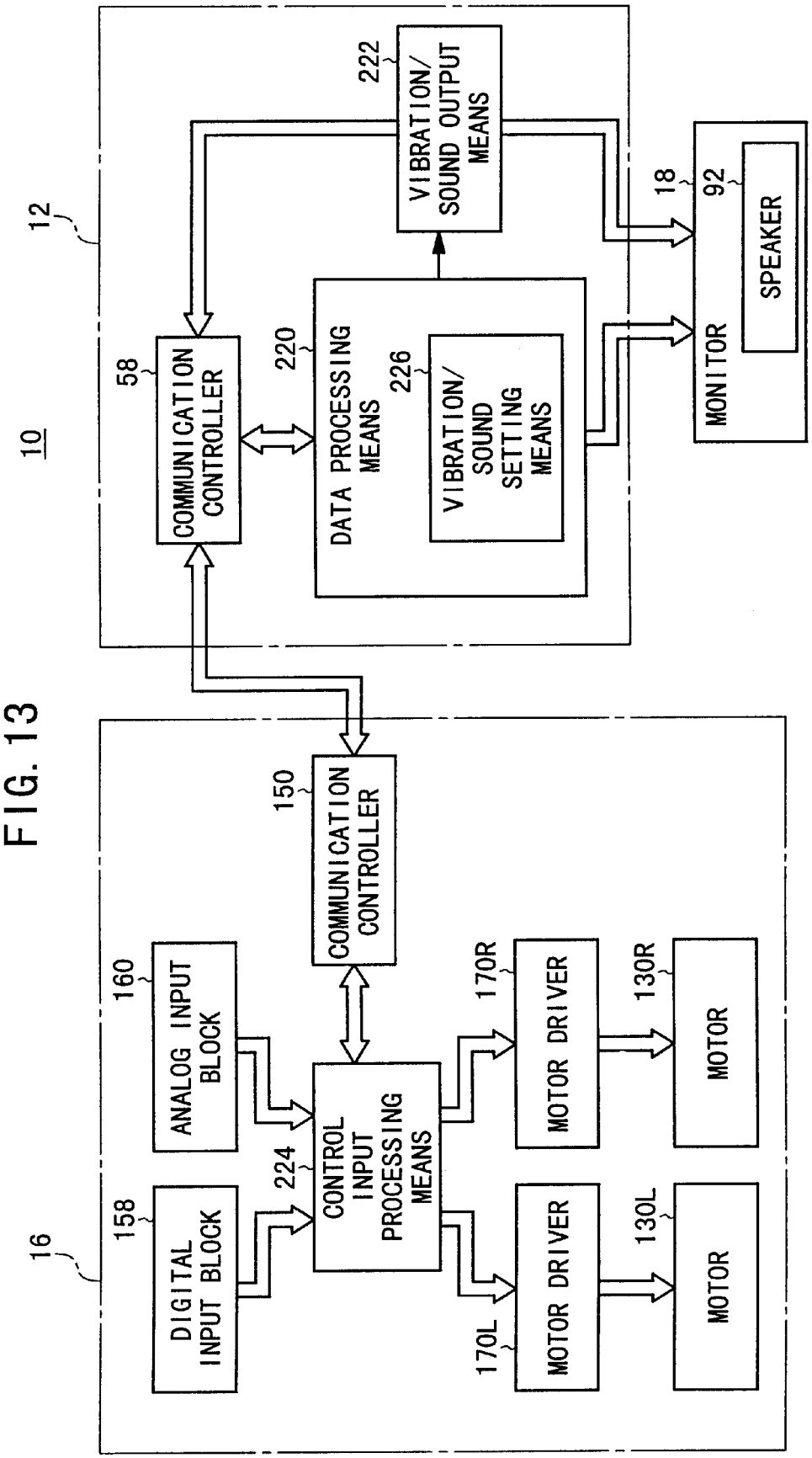
FIG. 13 is a functional block diagram of the entertainment system according to the present invention.

One example of software for performing the above characteristic functions, i.e., the vibration/sound setting function and the output function, will be described below. As shown in FIG. 13, the software comprises a data processing means 220 and a vibration/sound output means 222 which are incorporated in the entertainment apparatus 12, and a control input processing means 224 incorporated in the manual controller 16.

The data processing means 220 serves to process data according to control data from the manual controller 16, and has a vibration/sound setting means 226.

The vibration/sound setting means 226 sets up lengths of the first and second bars 208A, 208B displayed on the monitor 18 according to control entries from the manual controller 16 thereby to set up magnitudes of vibrations to be generated by the vibration imparting mechanisms 128R, 128L in the manual controller 16 depending on the lengths of the displayed bars 208A, 208B, and sets up a type and/or a pitch of sound data to be outputted to the speaker 92 of the monitor 18 depending on the lengths of the displayed bars 208A, 208B.

Each time the cursor 210 movable at a constant speed in a setting image on the monitor 18 is positioned at a step bar 208, the vibration/sound output means 222 imparts vibrations to the user at the magnitude set up by the vibration/sound setting means 226, and outputs sound data of the type and/or pitch depending on the lengths of the first and second bars 208A, 208B to the speaker 92 of the monitor 18.

The control input processing means 224 transmits control data according to a request from the entertainment apparatus 12, and energizes the motor 130R and/or the motor 130L based on a vibration generating command supplied from the entertainment apparatus 12.

The data processing means 220 including the vibration/sound setting means 226 and the vibration/sound output means 222 are downloaded in advance from the optical disk 20 played back by the entertainment apparatus 12 into the main memory 76 thereof according to a predetermined process, and executed by the CPU 72 of the entertainment apparatus 12.

The control input processing means 224 is transferred from the program memory 154, for example, of the manual controller 16 to the working RAM 156 thereof, and executed by the CPU 152 of the manual controller 16.

Figure 14:
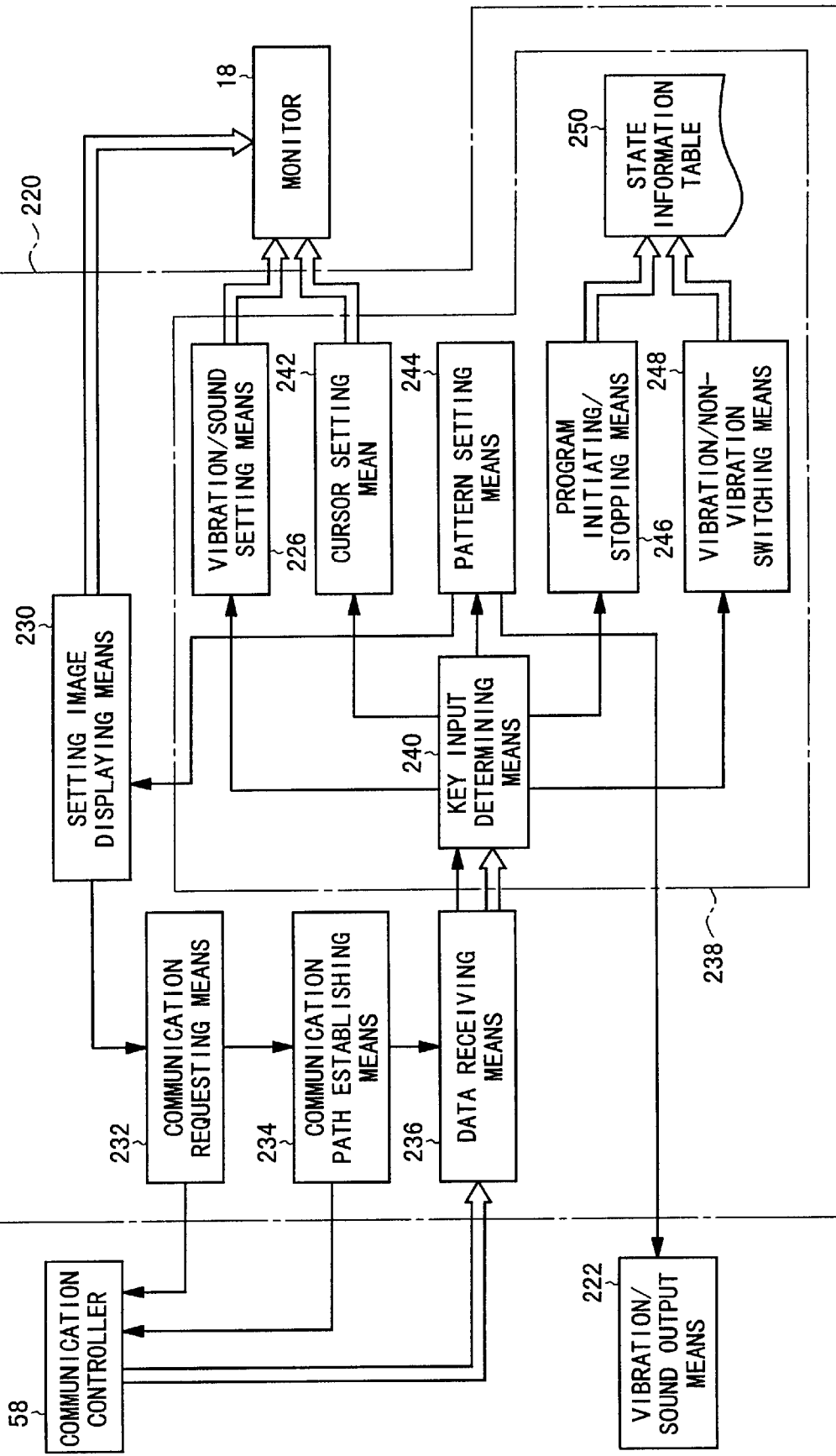
FIG. 14 is a functional block diagram of a data processing means.

As shown in FIG. 14, the data processing means 220 comprises a setting image displaying means 230 for displaying a setting image on the monitor 18, a communication requesting means 232 for requesting the manual controller 16 to transfer control data via the communication controller 58, a communication path establishing means 234 for starting to communicate with the communication controller 150 of the manual controller 16 via the communication controller 58 to establish a communication path, a data receiving means 236 for receiving control data from the manual controller 16 via the established communication path, and a key setting means 238 for carrying out a setting process depending on the received control data.

The key setting means 238 comprises the vibration/sound setting means 226, a key input determining means 240 for determining received control data, a cursor setting means 242 for moving and displaying a cursor based on a control input from the leftward control member 110d or the rightward control member 110b of the first control pad 34 of the manual controller 13, a pattern setting means 244 for indicating switching between setting images based on a control input from the L button 38L or the R button 38R, a program initiating/stopping means 246 for initiating or forcibly stopping the vibration/sound output means 222 based on a control input from the decision key 112d, and a vibration/non-vibration switching means 248 for deciding whether vibrations are to be generated or not based on a control input from the control member 112a marked with the symbol "Δ", i.e., the Δ key 112a.

Figure 16:
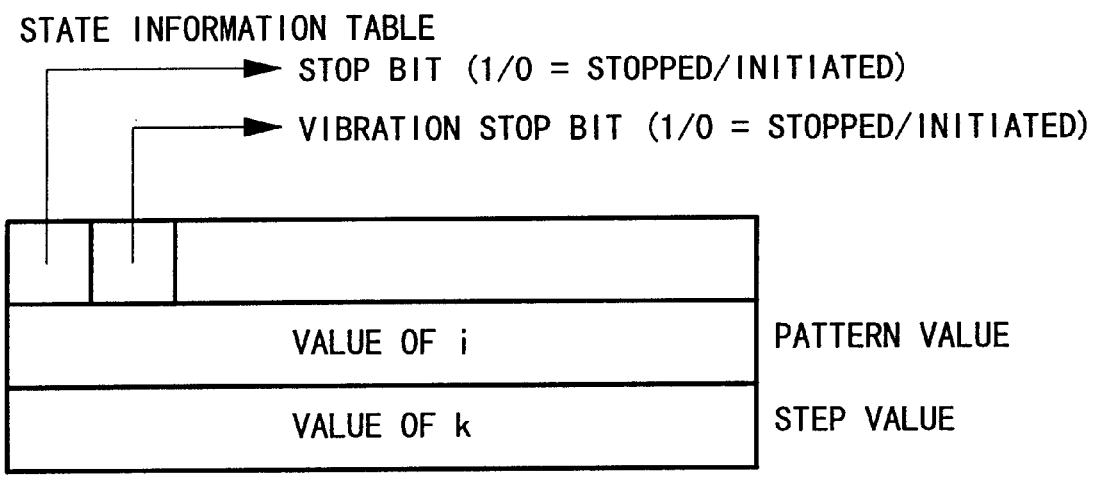
FIG. 16 is a diagram showing details of a state information table.

The program initiating/stopping means 246 and the vibration/non-vibration switching means 248 use a state information table 250. As shown in FIG. 16, the state information table 250 stores a stop bit for deciding whether the vibration/sound output means 222 is stopped or initiated (1/0=stopped/initiated), a vibration stop bit for deciding whether vibrations have been set or not (1/0=stopped/initiated), a present pattern value, and a present step value.

Figure 15:
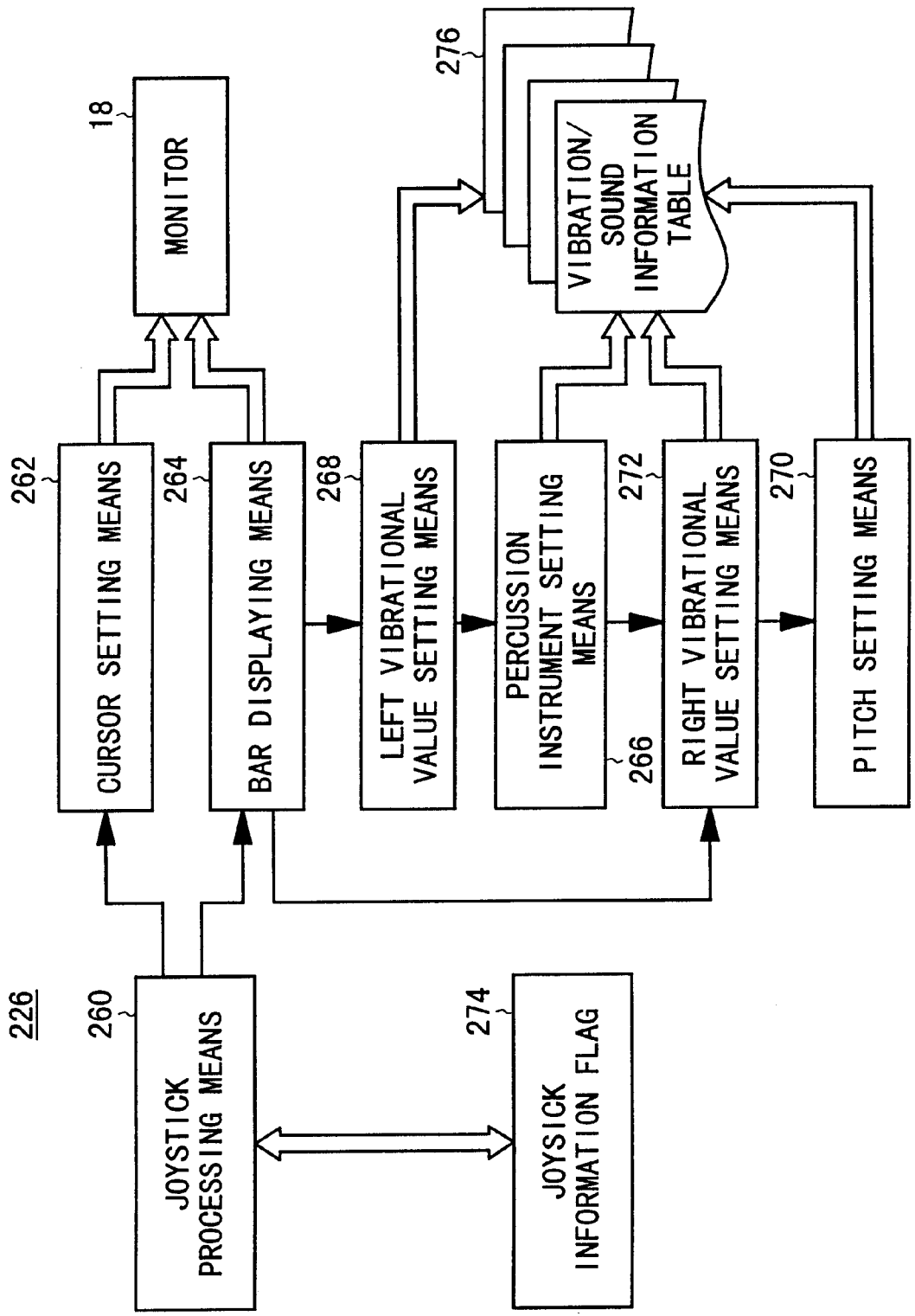
FIG. 15 is a functional block diagram of a vibration/sound setting means.

As shown in FIG. 15, the vibration/sound setting means 226 comprises a joystick processing means 260 for processing control input states and horizontal input values of the left and right joysticks 44, 46, a cursor setting means 262 for moving and displaying a cursor based on a horizontal input from the left joystick 44, a bar displaying means 264 for displaying the bars 208A, 208B in a vertically expandable or contractible manner based on control inputs from the left and right joysticks 44, 46, a percussion instrument setting means 266 for setting up a percussion instrument based on the length of the first bar 208A, a left vibrational value setting means 268 for setting up a left vibrational value $V_L$ based on the length of the first bar 208A, a pitch setting means 270 for setting up a bass pitch based on the length of the second bar 208B, and a right vibrational value setting means 272 for setting up a right vibrational value $V_R$ based on the length of the second bar 208B.

The vibration/sound setting means 226 uses a joystick information flag 274 and a vibration/sound information table 276.

Figure 17:
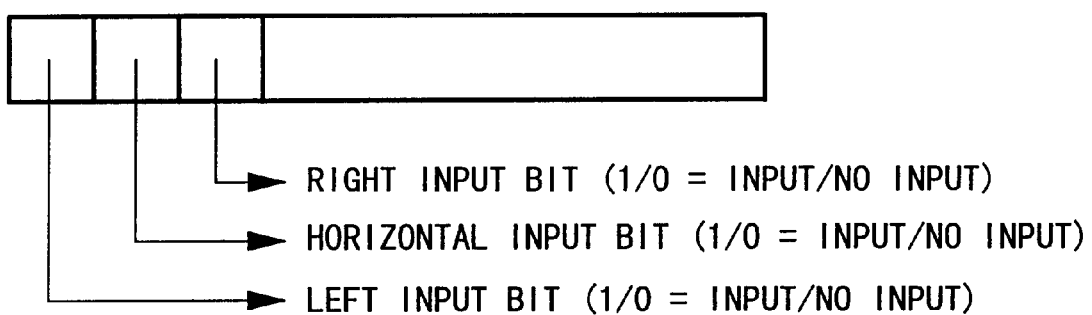
FIG. 17 is a diagram showing details of a joystick information flag.

As shown in FIG. 17, the joystick information flag 274 contains a left input bit indicative of an input from the left joystick 44 (1/0=input/no input), a horizontal input bit indicative of a horizontal input from the left joystick 44 (1/0=horizontal input/vertical input), and a right input bit indicative of an input from the right joystick 46 (1/0=input/no input).

Figure 18:
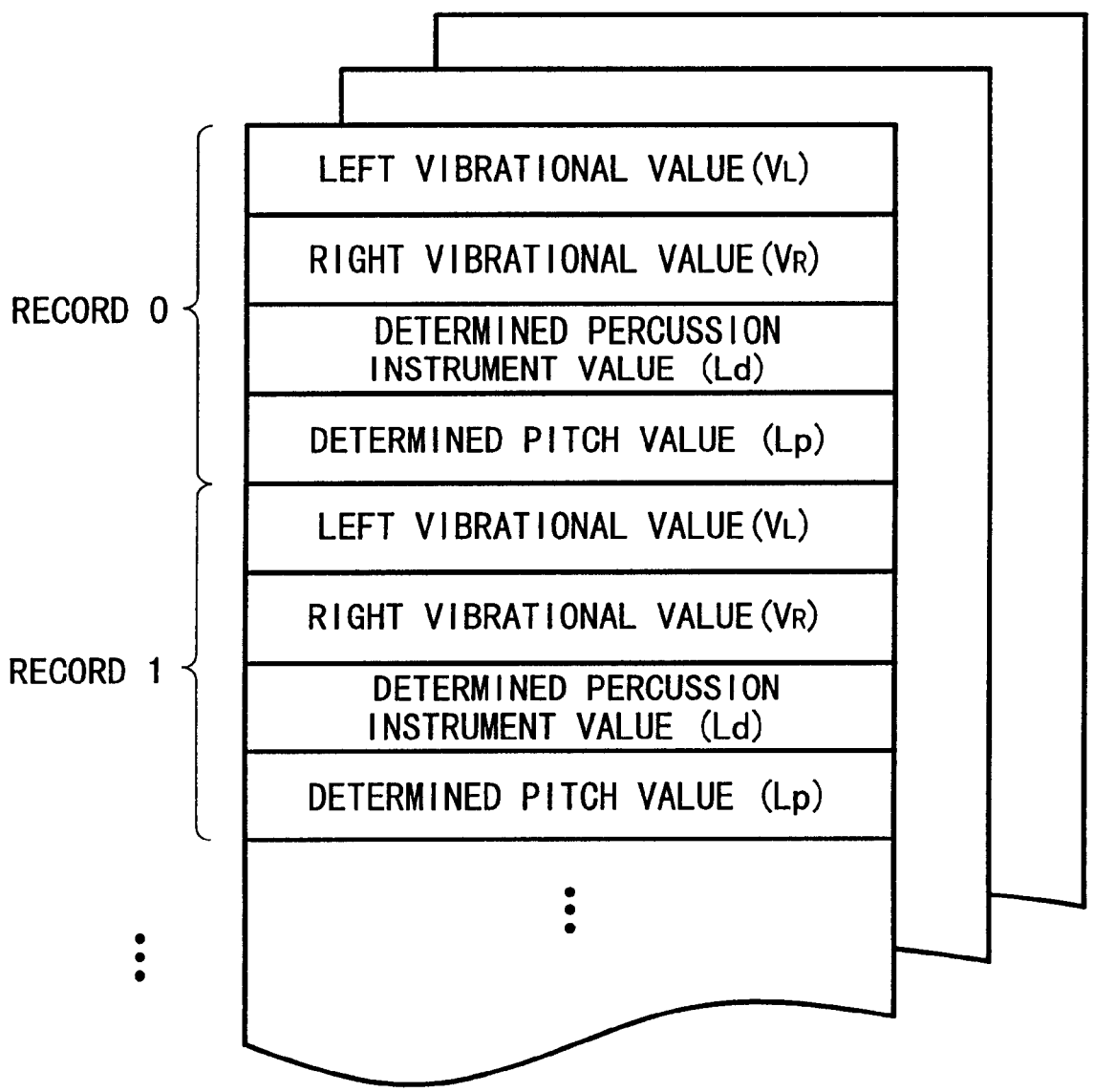
FIG. 18 is a diagram showing details of a vibration/sound information table.

As shown in FIG. 18, the vibration/sound information table 276 includes four tables, i.e., as many tables as the number of patterns (0–3). Each of the tables has as many records as the number of patterns, and stores a left vibrational value $V_L$, a right vibrational value $V_R$, a determined percussion instrument value Ld, and a determined pitch value Lp.

Figure 19:
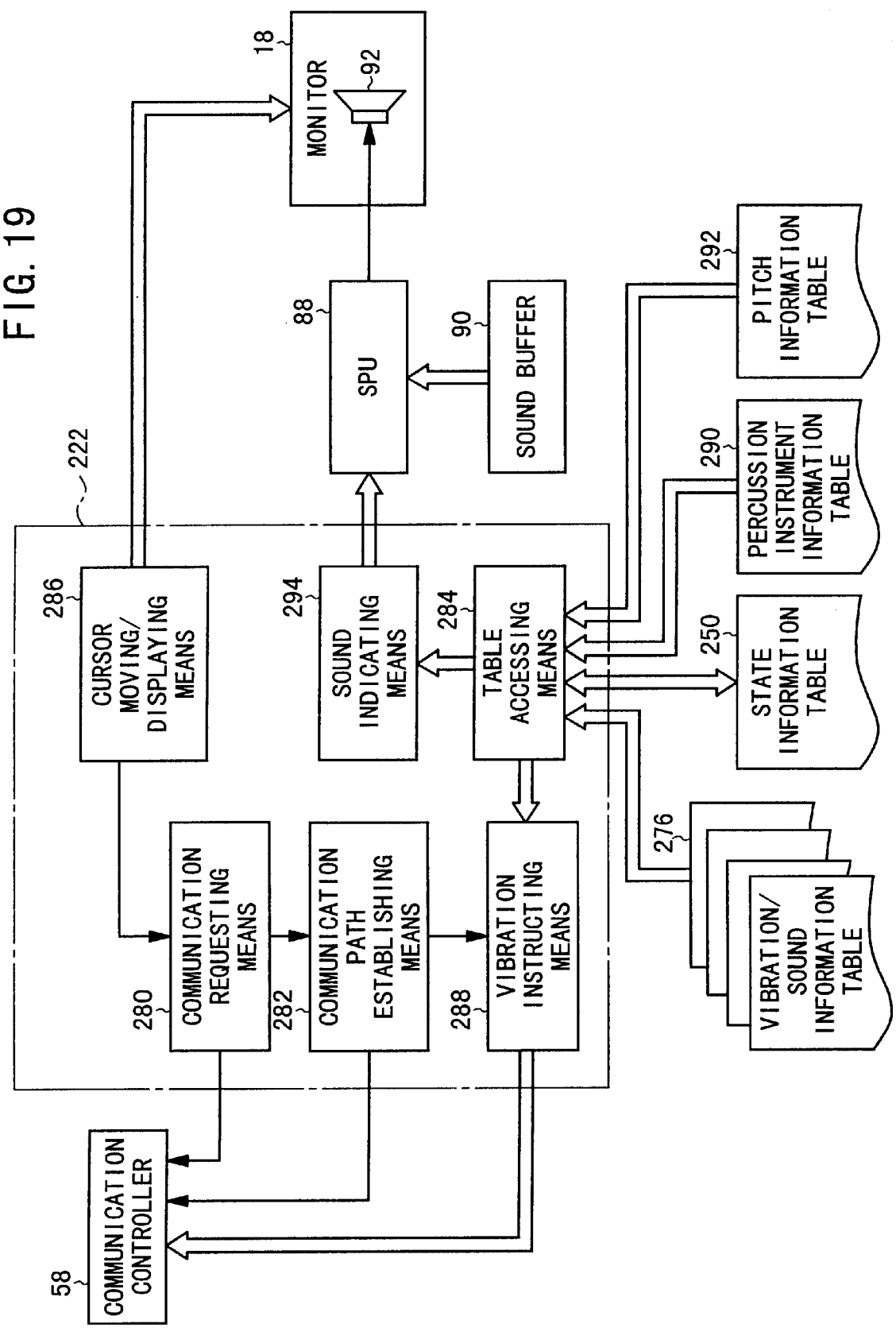
FIG. 19 is a functional block diagram of a vibration/sound output means.

As shown in FIG. 19, the vibration/sound output means 222 comprises a communication requesting means 280 for requesting the manual controller 16 to send a vibration generating command VC via the communication controller 58, a communication path establishing means 282 for starting to communicate with the communication controller 150 of the manual controller 16 via the communication controller 58 to establish a communication path, a table accessing means 284 for accessing various tables, a cursor moving/displaying means 286 for moving and displaying the cursor 210 on the monitor 18, a vibration instructing means 288 for generating a vibration generating command VC from left and right vibrational values $V_L$, $V_R$ stored in the vibration/sound information table 276 and sending the vibration generating command VC to the manual controller 16, and a sound indicating means 294 for outputting indication data representative of percussion instruments stored in a percussion instrument information table 290 and pitches stored in a pitch information table 292 to the SPU 88.

As shown in FIG. 20, the percussion instrument information table 290 has eight records corresponding to the eight horizontal strips Z0–Z7 in the bar displaying/setting area

200 in a setting image displayed on the monitor 18. The records store respective different data indicative of different percussion instruments, i.e., percussion instrument sound indication data (data for reading sound data of a percussion instrument from the sound buffer 90).

As shown in FIG. 21, the pitch information table 292 has eight records corresponding to the eight horizontal strips Z0–Z7. The records store respective different data indicative of different bass pitches, i.e., bass pitch indication data (data for reading sound data of a bass bitch from the sound buffer 90).

Figure 22:
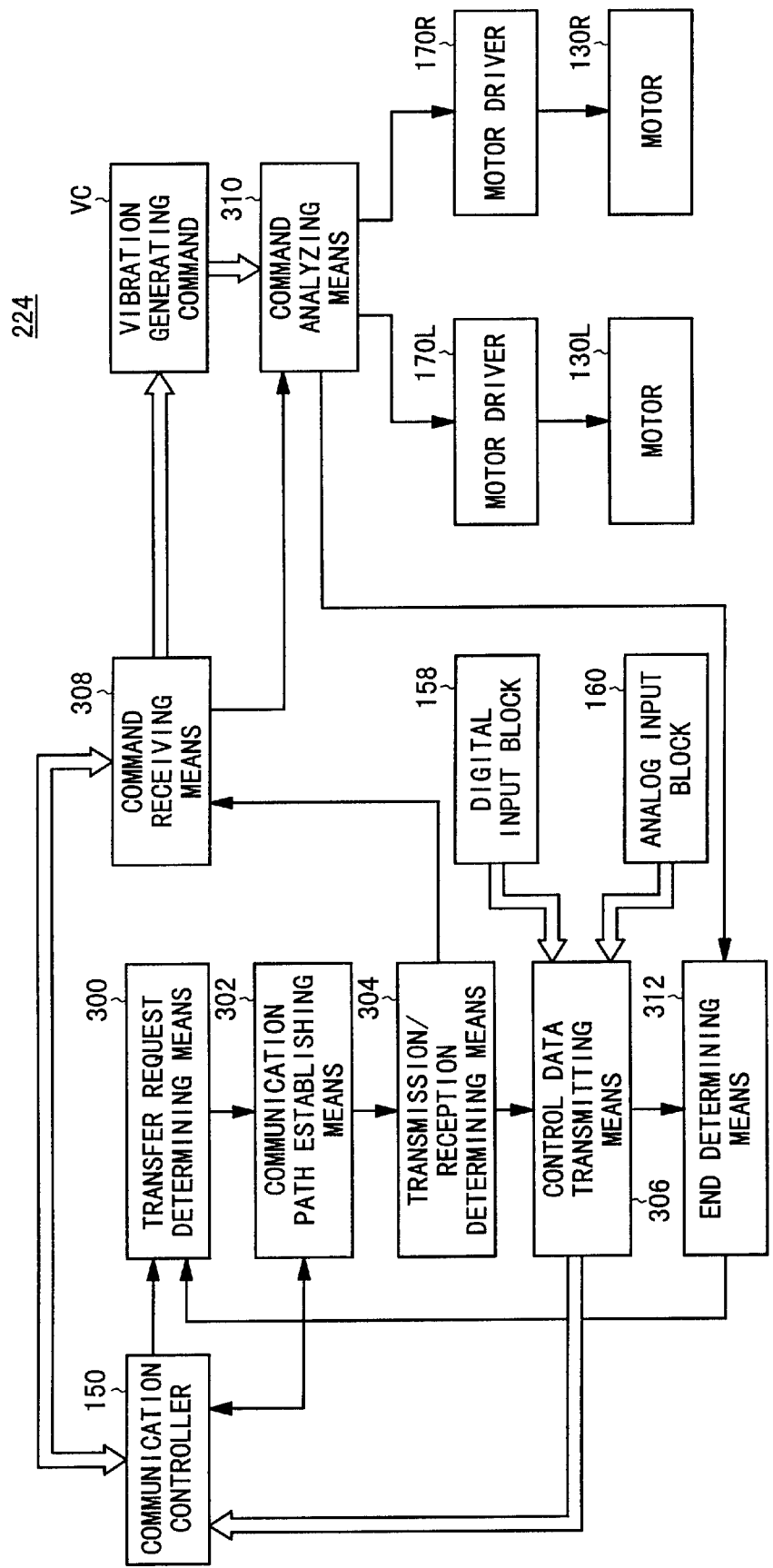
FIG. 22 is a functional block diagram of a control input processing means.

As shown in FIG. 22, the control input processing means 224 of the manual controller 16 comprises a transfer request determining means 300 for deciding whether there is a data transfer request supplied from the entertainment apparatus 12 via the communication controller 150, a communication path establishing means 302 for starting to communicate with the communication controller 58 of the entertainment apparatus 12 via the communication controller 150 to establish a communication path if there is a data transfer request from the entertainment apparatus 12, and a transmission/reception determining means 304 for deciding whether the data transfer request is a data transmission request or a data reception request.

The control input processing means 224 also comprises a control data transmitting means 306 for transmitting control data from the digital input block 158 and the analog input block 160 via the established communication path, a command receiving means 308 for receiving a vibration generating command VC from the entertainment apparatus 12 via the established communication path, a command analyzing means 310 for analyzing the received vibration generating command VC and outputting an analyzed result to the motor drivers 170R, 170L, and an end determining means 312 for deciding whether the processing in the manual controller 16 is finished or not.

Processing sequences of the data processing means 220 and the vibration/sound output means 222 which are incorporated in the entertainment apparatus 12, and the control input processing means 224 incorporated in the manual controller 16 will be described below with reference to FIGS. 23 through 37.

Figure 23:
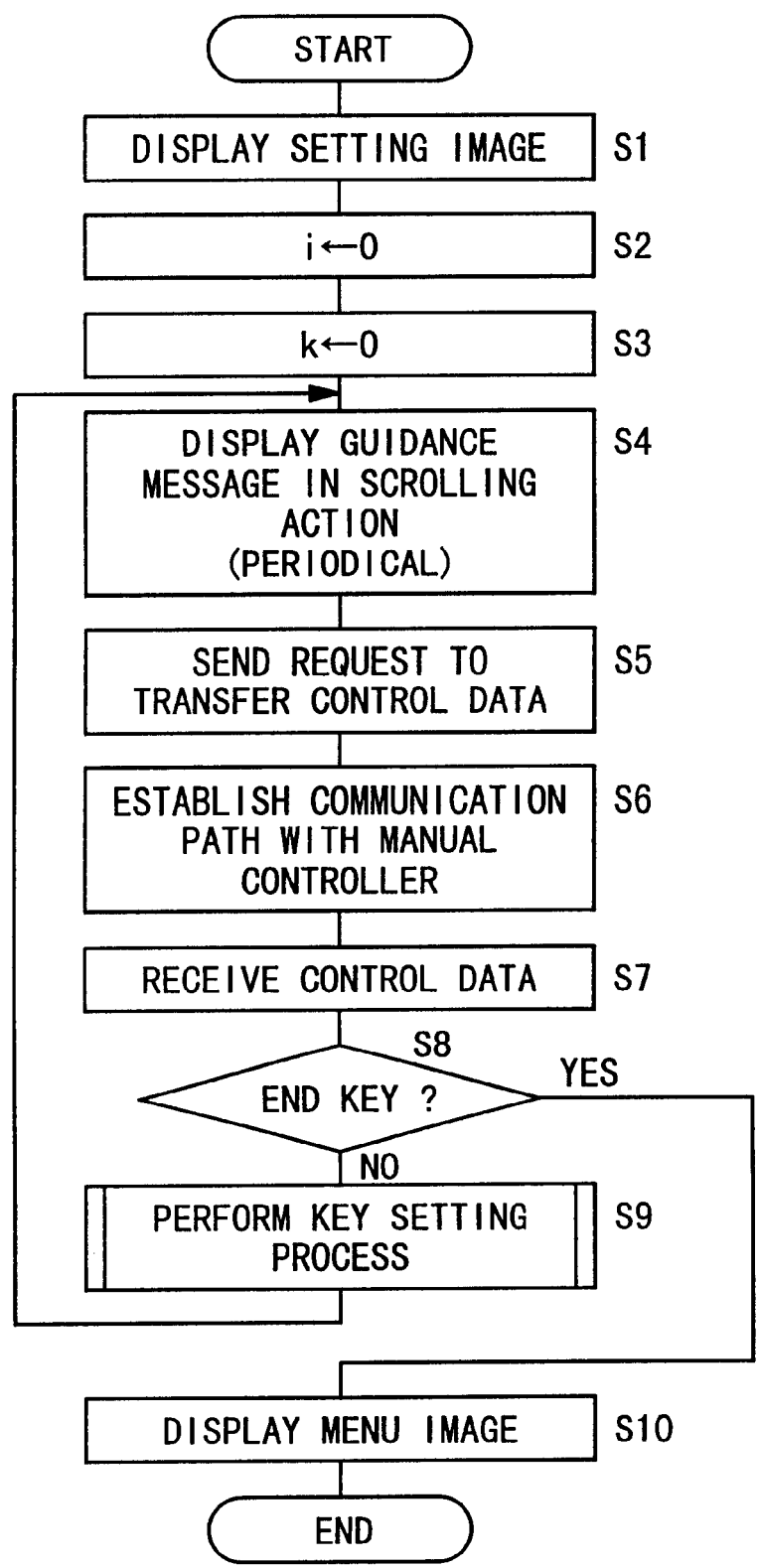
FIG. 23 is a flowchart of a processing sequence of a data processing means.

In step S1 shown in FIG. 23, the setting image displaying means 230 (see FIG. 14) of the data processing means 220 displays the setting image (see FIG. 11) on the monitor 18.

In step S2, the data processing means 220 stores an initial value "0" in an index register i used to update a pattern value, thereby initializing the index register i.

Then, in step S3, the data processing means 220 stores an initial value "0" in an index register k used to update a step value, thereby initializing the index register k.

In step S4, the setting image displaying means 230 displays a message of the guidance in the message displaying area 206 in a left scrolling action.

In step S5, the communication requesting means 232 requests the manual controller 16 to transfer control data via the communication controller 58.

In step S6, the communication path establishing means 234 starts to communicate with the communication controller 150 of the manual controller 16 via the communication controller 58 to establish a communication path.

A processing sequence of the manual controller 16 at this time will be described below with reference to FIG. 37.

Figure 37:
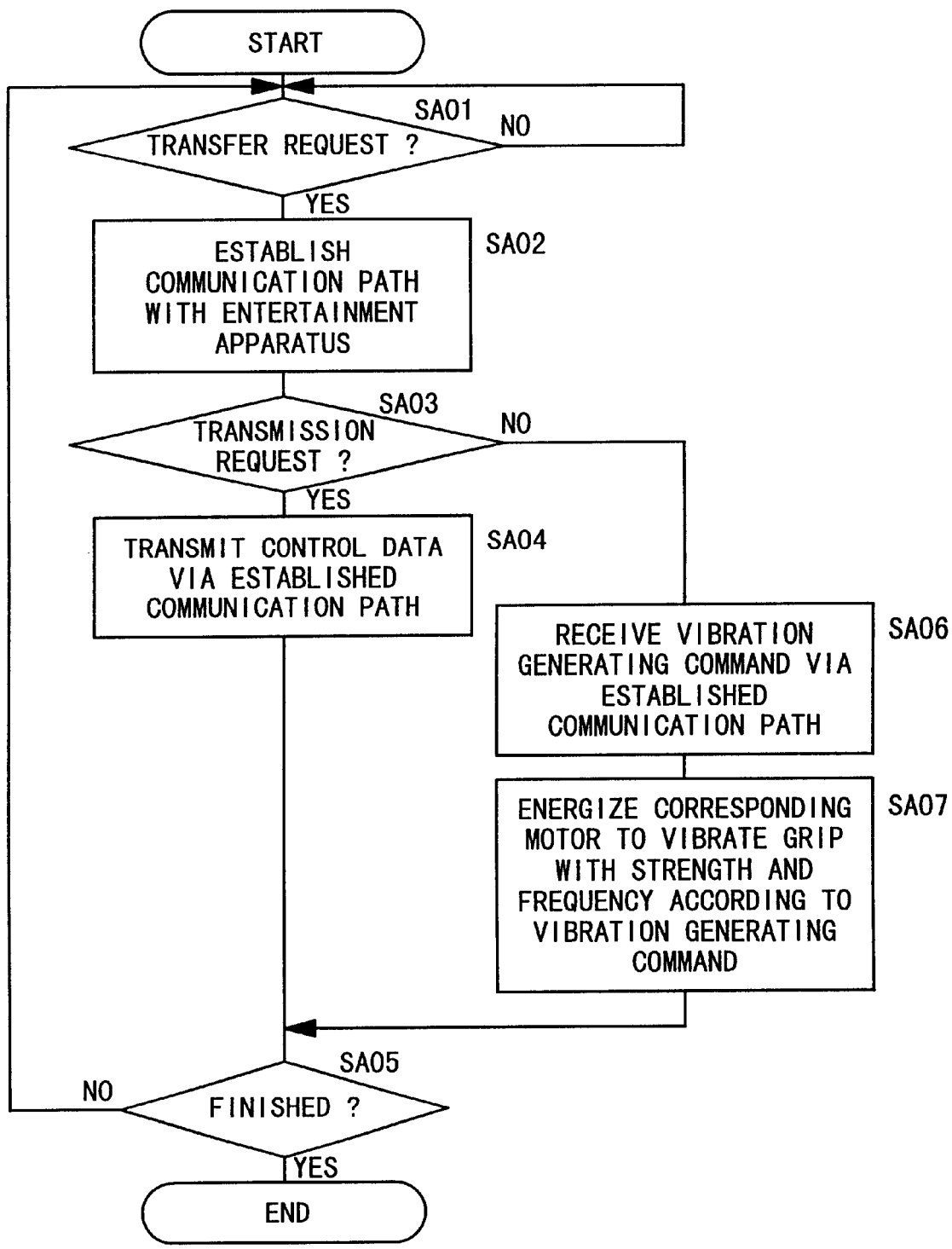
FIG. 37 is a flowchart of a processing sequence of the control input processing means.

In step SA01 shown in FIG. 37, the transfer request determining means 300 (see FIG. 22) of the control input processing means 224 waits for a transfer request for control data from the entertainment apparatus 12.

If there is a transfer request for control data from the entertainment apparatus 12, then control proceeds to step SA02 in which the communication path establishing means 302 starts to communicate with the communication controller 58 of the entertainment apparatus 12 via the communication controller 150 to establish a communication path. At this time, the communication path establishing means 302 establishes a communication path in cooperation with the establishment of the communication path by the data processing means 220 in step S6.

In step SA03, the transmission/reception determining means 304 decides whether the present data transfer request from the entertainment apparatus 12 is a data transmission request or not.

If the data transfer request is a data transmission request, then control proceeds to step SA04 in which the control data transmitting means 306 transmits control data from the digital input block 158 and the analog input block 160 via the established communication path.

After step SA04, control goes to step SA05 in which the end determining means 312 decides whether there is an end request to finish the processing in the manual controller 16 or not. If there is no end request, then control returns to step SA01 to transmit control data again.

Control then returns to the routine of the data processing means 220 shown in FIG. 23. In step S7, the data receiving means 236 (see FIG. 14) receives control data from the manual controller 16 via the established communication path, and stores the received control data into the main memory 76 (see FIG. 8), for example.

In step S8, it is decided whether the present control data represents an end of the process, i.e., control data from an end key, or not. If the present control data does not represent control data from the end key, then control goes to step S9 in which the key setting means 238 carries out its own processing sequence. If the present control data represents control data from the end key, then the setting image displaying means 230 displays a menu image on the monitor 18 in step S10, after which the processing of the data processing means 220 is ended.

The process carried out by the key setting means 238 in step S9 will be described below with reference to FIG. 24.

Figure 24:
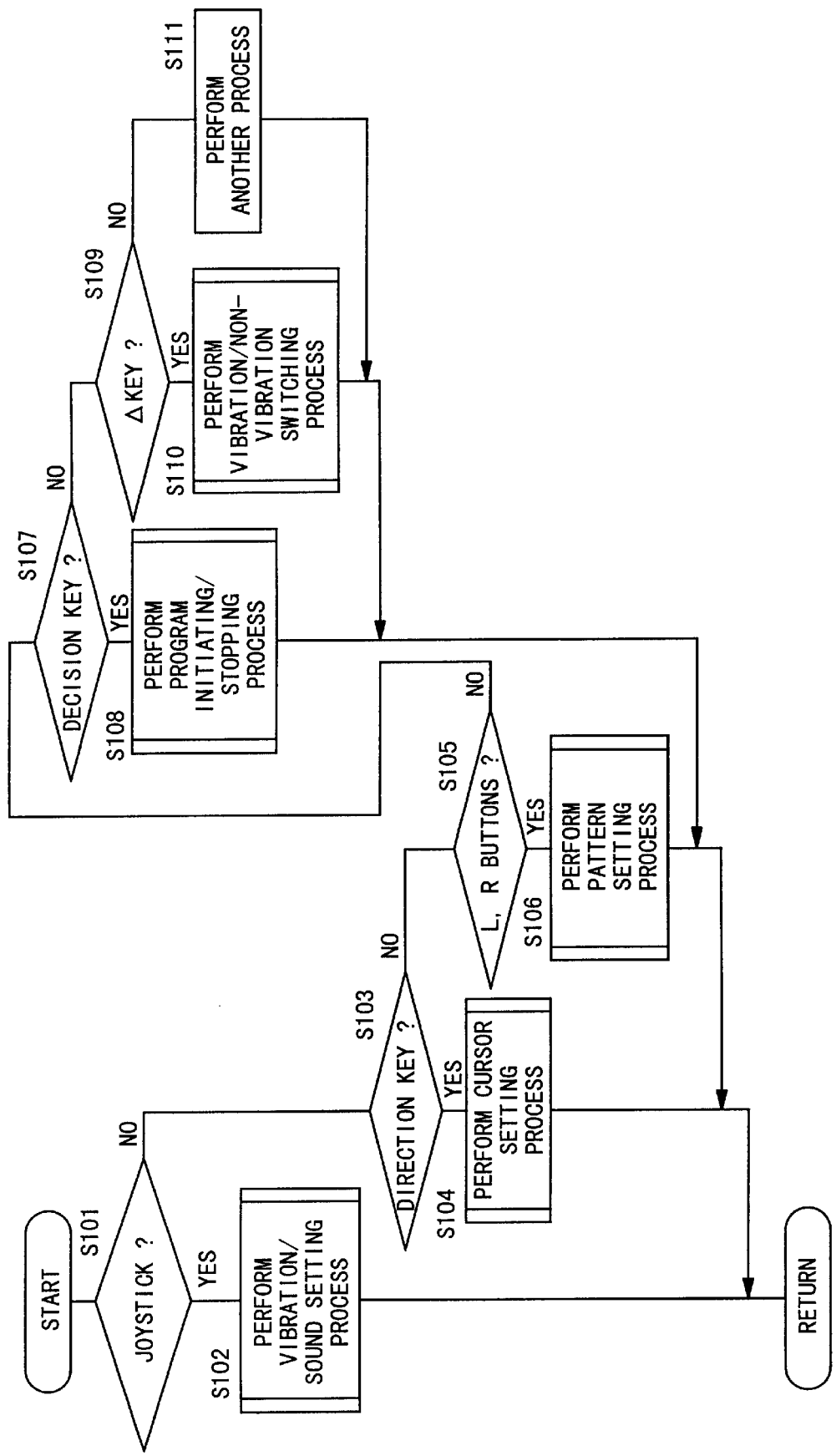
FIG. 24 is a flowchart of a processing sequence of a key setting processing means.

In step S101 shown in FIG. 24, the key setting means 238 decides whether the present control data comes from the joysticks 44, 46 or not. If the present control data comes from the joysticks 44, 46, then control goes to step S102 in which the vibration/sound setting means 226 performs its own processing sequence.

If the present control data does not come from the joysticks 44, 46 in step S101, then control goes to step S103 in which the key setting means 238 decides whether the present control data comes from a direction key, i.e., the leftward control member 110d or the rightward control member 110b of the first control pad 34 or not. If the present control data comes from a direction key, then control goes to step S104 in which the cursor setting means 242 performs its own processing sequence.

If the present control data does not come from a direction key in step S103, then control goes to step S105 in which the key setting means 238 decides whether or not the present control data comes from the L button 38L or the R button 38R. If the present control data comes from the L button 38L or the R button 38R, then control goes to step S106 in which the pattern setting means 244 performs its own processing sequence.

If the present control data does not come from the L button 38L or the R button 38R in step S105, then control goes to step S107 in which the key setting means 238 decides whether or not the present control data comes from the decision key 112d, i.e., the control member marked with the symbol "○". If the present control data comes from the decision key 112d, then control goes to step S108 in which the program initiating/stopping means 246 performs its own proccessing sequence.

If the present control data does not come from the decision key 112d in step S107, then control goes to step S109 in which the key setting means 238 decides whether the present control data comes from the Δ key 112a, i.e., the control member marked with the symbol "Δ" or not. If the present control data comes from the A key 112a, then control goes to step S110 in which the vibration/non-vibration switching means 248 performs its own processing sequence.

If the present control data does not come from the Δ key 112a, then control goes to step S111 in which the key setting means 238 performs another process depending on the control data.

The processing sequences of the vibration/sound setting 15, means 226, the cursor setting means 242, the pattern setting means 244, the program initiating/stopping means 246, and the vibration/non-vibration switching means 248 will be described below with reference to FIGS. 25 through 36.

Figure 25:
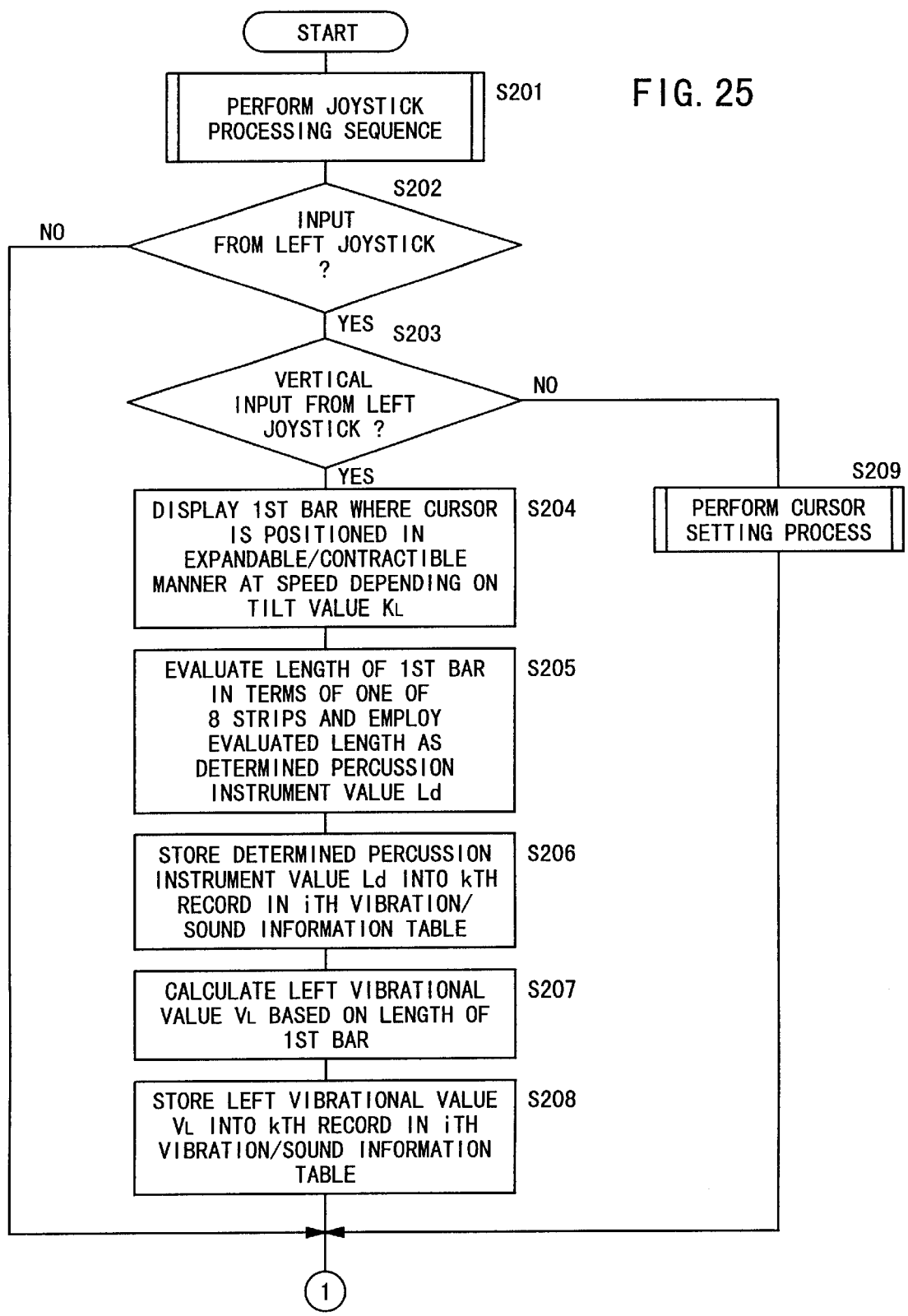
FIGS. 25 and 26 are a flowchart of a processing sequence of the vibration/sound setting means.
Figure 26:
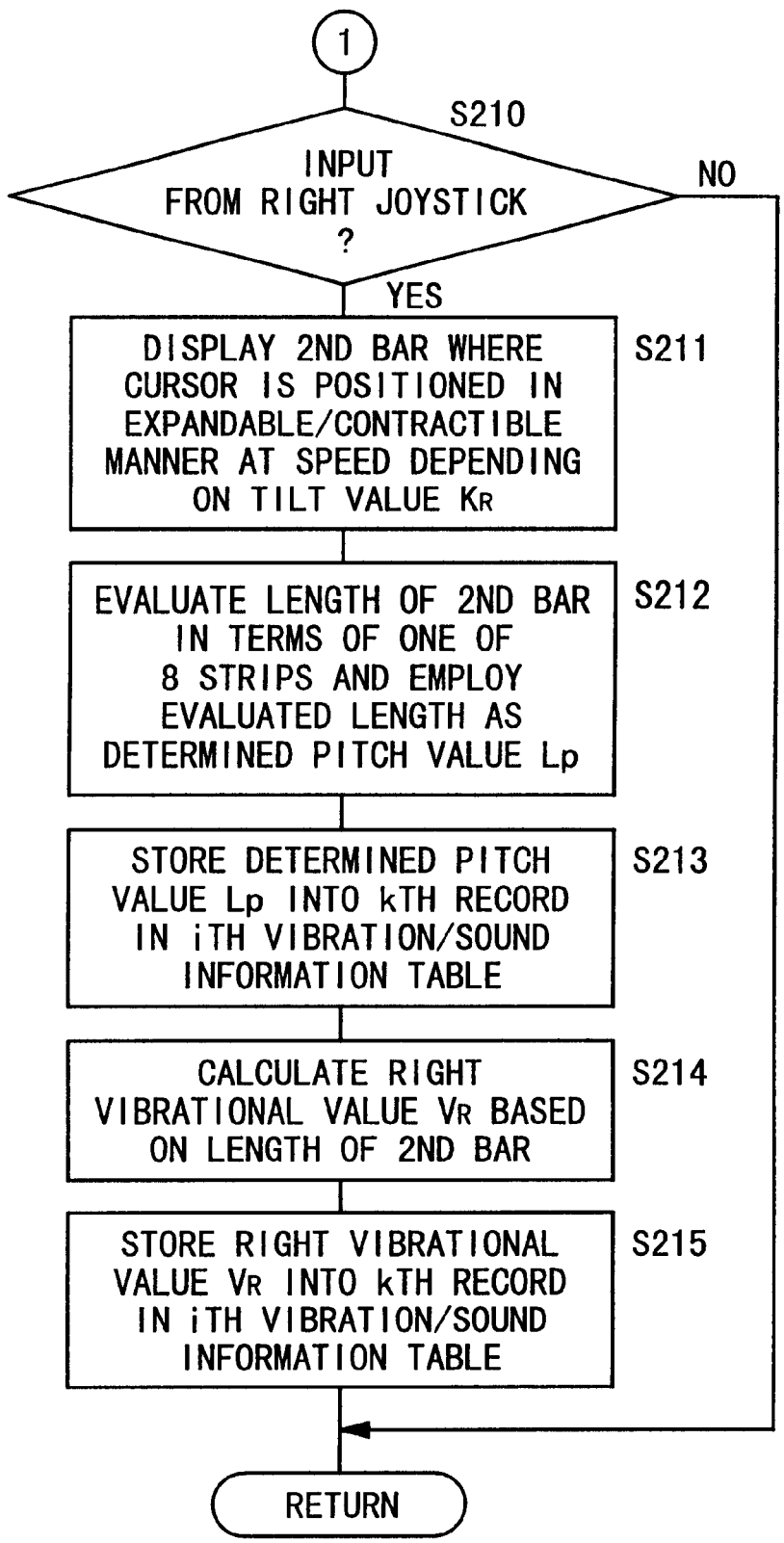
Figure 27:
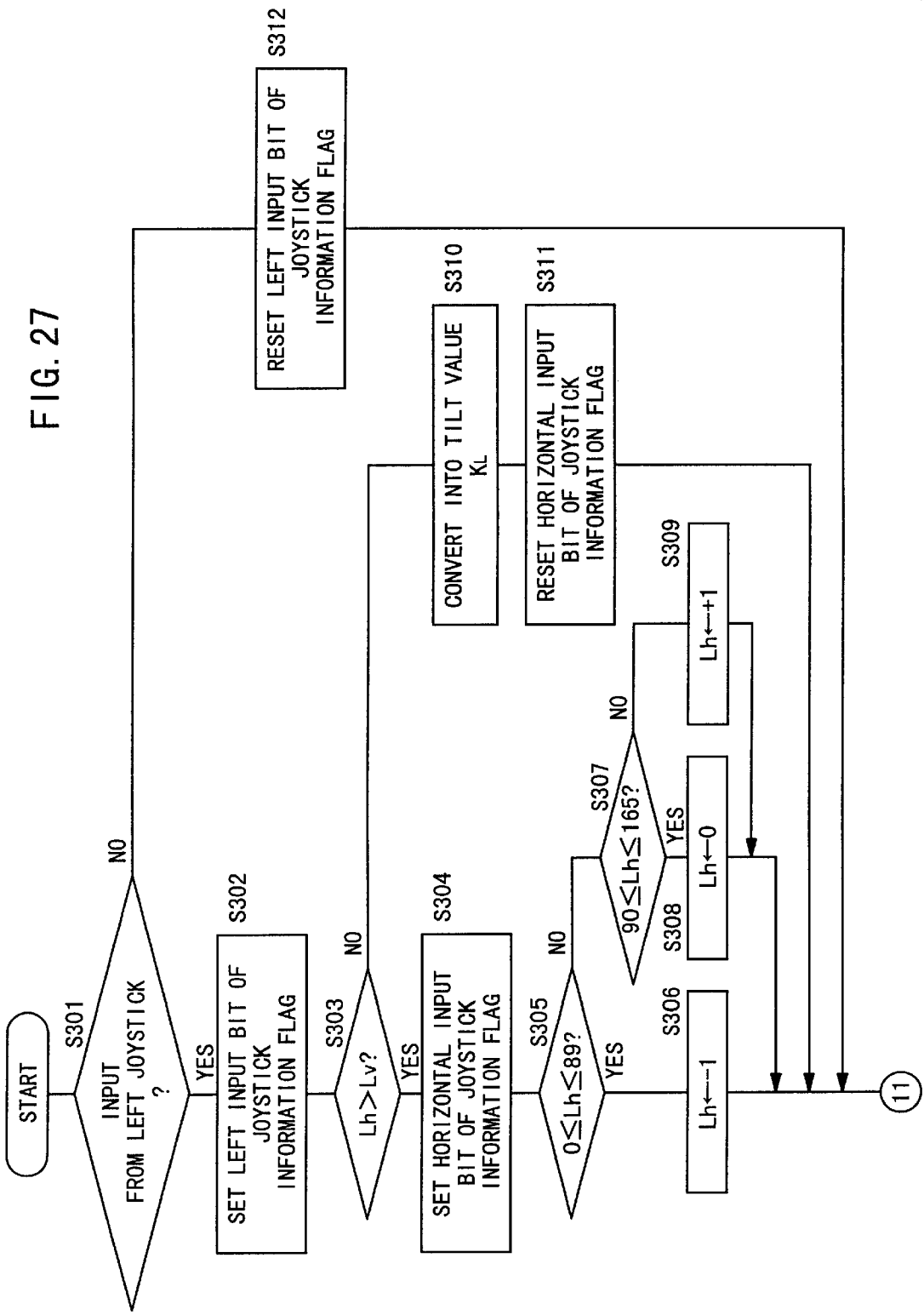
FIGS. 27 and 28 are a flowchart of a processing sequence of a joystick processing means.

In step S201 shown in FIG. 25, the joystick processing means 260 (see FIG. 15) of the vibration/sound setting means 226 performs its processing sequence. The processing sequence of the joystick processing means 260 will be described below with reference to FIGS. 27 and 28. In step S301 shown in FIG. 27, the joystick processing means 260 decides whether there is an input from the left joystick 44 or not. If there is an input from the left joystick 44, then the joystick processing means 260 sets the left input bit of the joystick information flag 274 shown in FIG. 17 to "1".

In step S303, the joystick processing means 260 decides whether the horizontal value Lh is greater than the vertical value Lv or not. If the horizontal value Lh is greater than the vertical value Lv, then control goes to step S304 in which the joystick processing means 260 sets the horizontal input bit of the joystick information flag 274 to "1".

In step S305, the joystick processing means 260 determines the magnitude of the horizontal value Lh. If the horizontal value Lh is in the range of $0 \leq Lh \leq 89$, then control goes to step S306 in which the joystick processing means 260 defines "−1" as the horizontal value Lh.

If the horizontal value Lh is not in the range of $0 \leq Lh \leq 89$ in step S305, then control goes to step S307. If the horizontal value Lh is in the range of $90 \leq Lh \leq 165$ in step S307, then control goes to step S308 in which the joystick processing means 260 defines "0" as the horizontal value Lh. If the horizontal value Lh is in the range of $166 \leq Lh \leq 255$, then control goes to step S309 which the joystick processing means 260 defines "+0" as the horizontal value Lh.

If the horizontal value Lh is equal to or smaller than the vertical value Lv in step S303, then control goes to step S310 in which the joystick processing means 260 converts the horizontal value Lh and the vertical value Lv into a value indicative of only the tilt of the left joystick 44, i.e., a tilt value $K_L$, according to the following equation:

$$K_L = \sqrt{\{(Lv-128)^2 + (Lh-128)^2\}}$$

As a result, the tilt value $K_L$ falls in the range of $0 \leq K_L \leq 127$.

Thereafter, the joystick processing means 260 sets the horizontal input bit of the joystick information flag 274 to "0" in step S311.

If there is no input from the left joystick 44 in step S301, then control goes to step S312 in which the joystick processing means 260 resets the left input bit of the joystick information flag 274 to "0".

Figure 28:
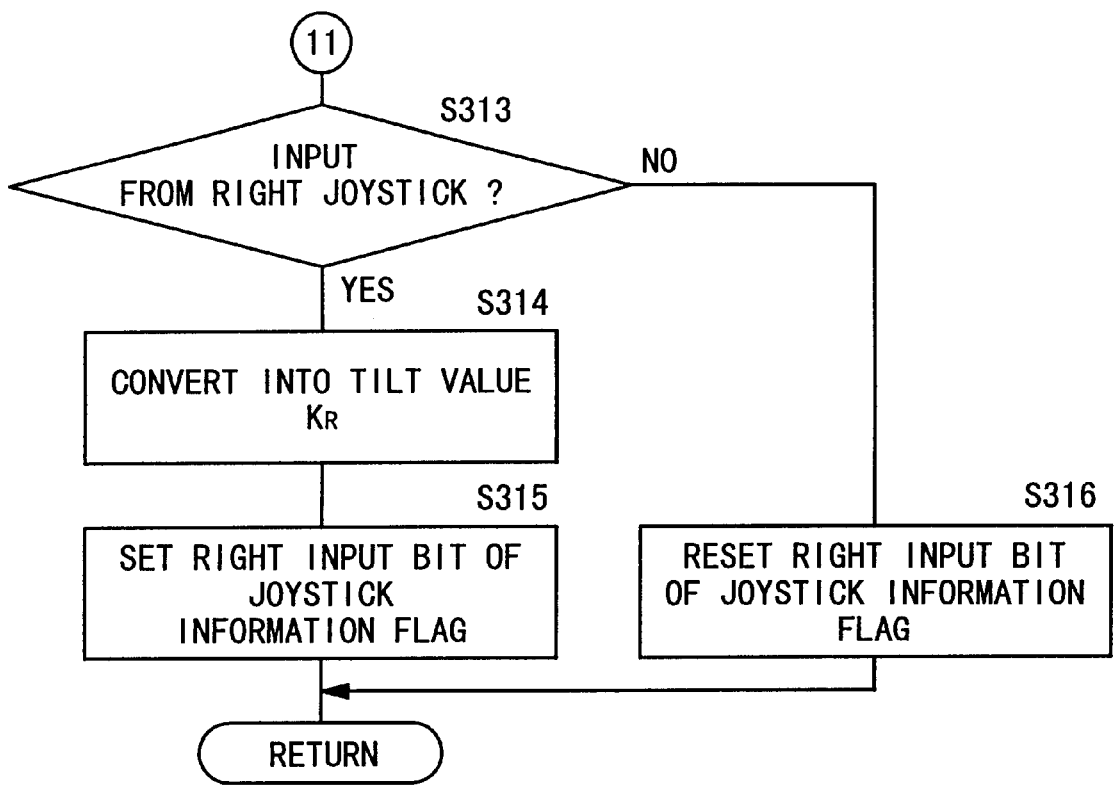
Figure 29:
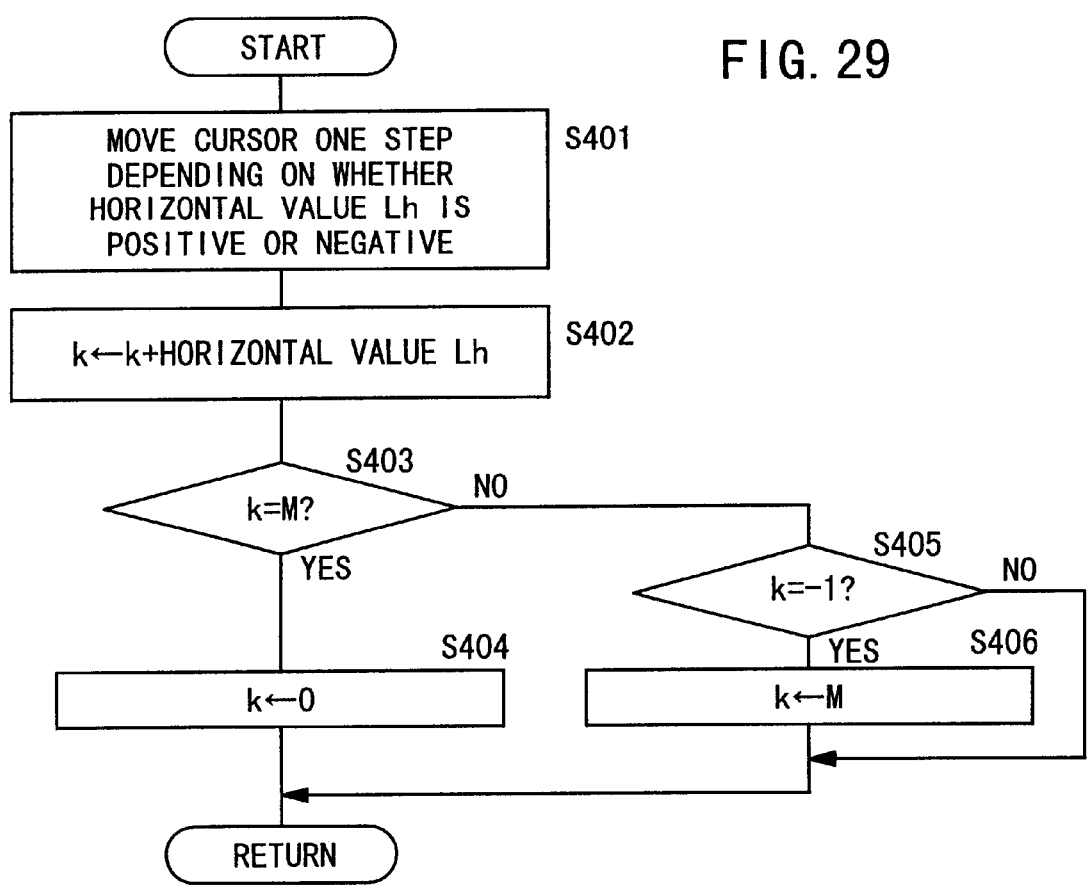
FIG. 29 is a flowchart of a processing sequence of a cursor setting means in the vibration/sound setting means.

In step S313 shown in FIG. 28, the joystick processing means 260 decides whether there is an input from the right joystick 46 or not. If there is an input from the right joystick 46, then control goes to step S314 in which the joystick processing means 260 converts the horizontal value Rh and the vertical value Rv into a value indicative of only the tilt of the right joystick 46, i.e., a tilt value $K_R$, according to the following equation:

$$K_R = \sqrt{\{(Rv-128)^2 + (Rh-128)^2\}}$$

As a result, the tilt value $K_R$ falls in the range of $0 \leq K_R \leq 127$.

Thereafter, in step S315, the joystick processing means 260 sets the right input bit of the joystick information flag 274 to "1". If there is no input from the right joystick 46, then control goes to step S316 in which the joystick processing means 260 resets the right input bit of the joystick information flag 274 to "0".

When the processing in step S315 or step S316 is finished, the process carried out by the joystick processing means 260 comes to an end.

Control then returns to the routine shown in FIG. 25. In step S202, the vibration/sound setting means 226 decides whether there is an input from the left joystick 44 or not by deciding whether the left input bit of the joystick information flag 274 is set to "1" or not.

If there is an input from the left joystick 44, then control goes to step S203 in which the vibration/sound setting means 226 decides whether the input is a vertical input from the left joystick 44 or not by deciding whether the horizontal input bit of the joystick information flag 274 is reset to "0" or not.

If the input is a vertical input from the left joystick 44, then control goes to step S204 in which the bar displaying means 264 displays the first bar 208A where the present cursor 210 is positioned in a vertically expandable or contractible manner at a speed depending on the tilt value $K_L$ of the left joystick 44.

In step S205, the percussion instrument setting means 266 evaluates the length of the first bar 208A in terms of one of the eight horizontal strips Z0–Z7, and employs the evaluated length as a determined percussion instrument value Ld. Then, in step S206, the percussion instrument setting means 266 stores the determined percussion instrument value Ld into a kth record in an ith vibration/sound information table 276.

In step S207, the left vibrational value setting means 268 calculates a left vibrational value $V_L$ based on the length of the first bar 208A according to the following equation:

$$V_L = 255 \times \text{(the present length of the first bar/entire length thereof)}$$

Then, in step S208, the left vibrational value setting means 268 stores the calculated left vibrational value $V_L$ into the kth record in the ith vibration/sound information table 276.

If the input is not a vertical input, but a horizontal input from the left joystick 44 in step S203, then control goes to step S209 in which the cursor setting means 262 performs its own processing sequence.

The processing sequence of the cursor setting means 262 in step S209 will be described below with reference to FIG.

29. In step S401 shown in FIG. 29, the cursor setting means 262 moves the cursor 210 one step to the right or left depending whether the horizontal value Lh is positive or negative.

In step S402, the cursor setting means 262 updates the value of the index register k by the horizontal value. In step S403, the cursor setting means 262 decides whether the value of the index register k is the same as the maximum number M of steps or not. If the value of the index register k is the same as the maximum number M of steps, then control goes to step S404 in which the cursor setting means 262 defines "0" as the value of the index register k.

If the value of the index register k is not the same as the maximum number M of steps in step S403, then the cursor setting means 262 decides whether the value of the index register k is "−1" or not in step S405. If the value of the index register k is "−1", then control goes to step S406 in which the cursor setting means 262 defines the maximum number M of steps as the value of the index register k.

When the processing in step S404 or step S406 is finished or if the value of the index register k is not "−1" in step S405, the process carried out by the cursor setting means 262 comes to an end.

Control then returns to the routine shown in FIG. 25. When the processing in step S208 is finished, or the processing sequence of the cursor setting means 262 in step S209 is finished, or if there is no input from the left joystick 44, control proceeds to step S210 shown in FIG. 26. In step S210, the vibration/sound setting means 226 decides whether there is an input from the right joystick 46 or not by deciding whether the right input bit of the joystick information flag 274 is set to "1" or not.

If there is an input from the right joystick 46, then control goes to step S211 in which the bar displaying means 264 displays the second bar 208B where the present cursor 210 is positioned in a vertically expandable or contractible manner at a speed depending on the tilt value $K_R$ of the right joystick 46.

In step S212, the pitch setting means 270 evaluates the length of the second bar 208B in terms of one of the eight horizontal strips Z0–Z7, and employs the evaluated length as a determined pitch value Lp. Then, in step S213, the pitch setting means 270 stores the determined pitch value Lp into the kth record in the ith vibration/sound information table 276.

In step S214, the right vibrational value setting means 272 calculates a right vibrational value $V_R$ based on the length of the second bar 208B. Specifically, if the length of the second bar 208B is greater than "0", then the right vibrational value setting means 272 defines "1" as the right vibrational value $V_R$, and if the length of the second bar 208B is "0", then the right vibrational value setting means 272 defines "0" as the right vibrational value $V_R$.

In step S215, the pitch setting means 270 stores the right vibrational value $V_R$ into the kth record in the ith vibration/sound information table 276.

When the processing in step S215 is finished, or if there is no input from the right joystick 46, the processing sequence of the vibration/sound setting means 226 is finished.

The processing sequence of the cursor setting means 242 in step S104 shown in FIG. 24 will be described below with reference to FIG. 30.

Figure 30:
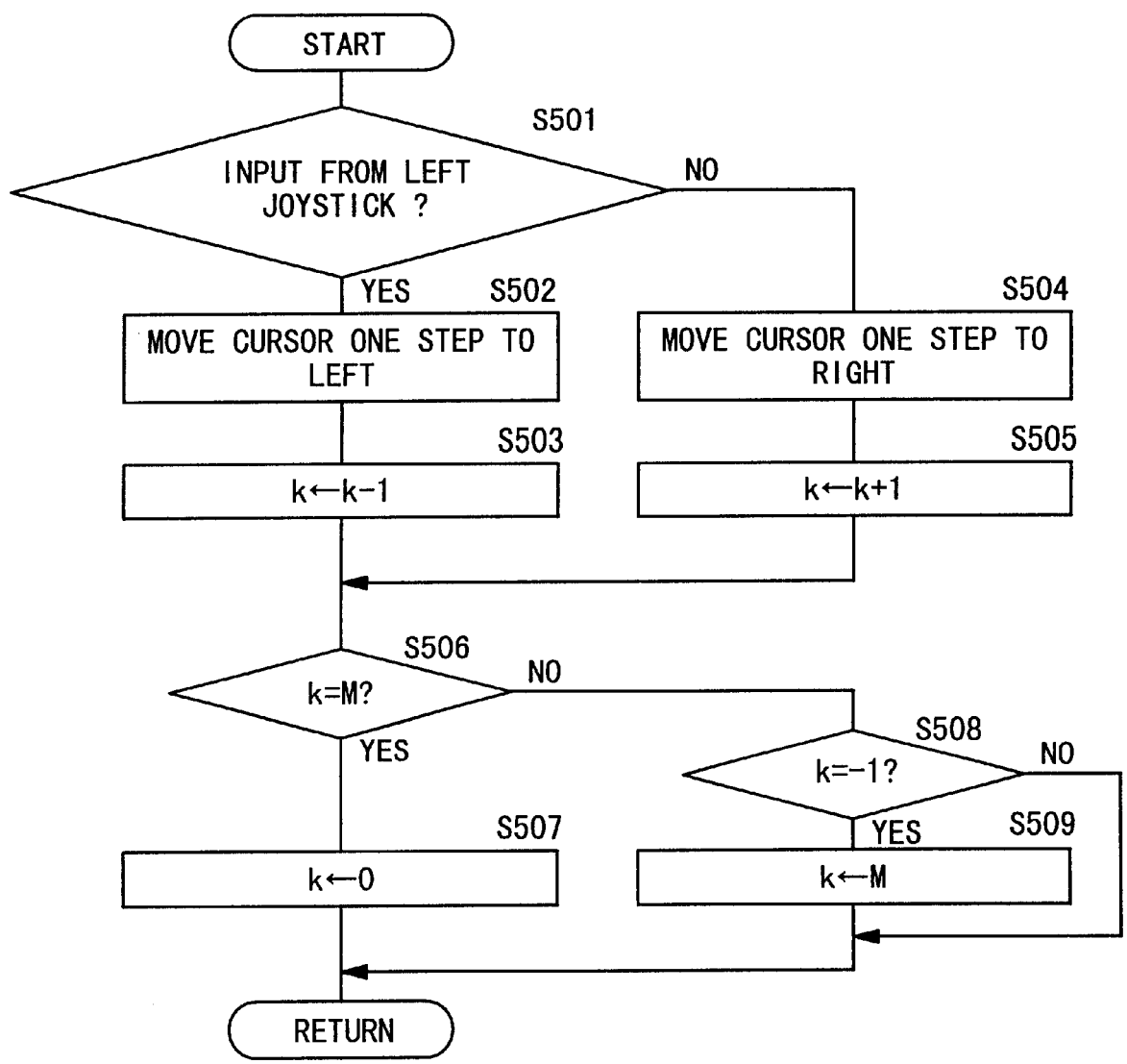
FIG. 30 is a flowchart of a processing sequence of a cursor setting means in the data processing means.

In step S501 shown in FIG. 30, the cursor setting means 242 decides whether there is an input from the left joystick 44 or not. If there is an input from the left joystick 44, then control goes to step S502 in which the cursor setting means 242 moves the cursor 210 one step to the left. Thereafter, the cursor setting means 242 updates the value of the index register k by "−1" in step S503.

If there is an input from the right joystick 46, but not from left joystick 44, in step S501, then control goes to step S504 in which the cursor setting means 242 moves the cursor 210 one step to the right. Thereafter, the cursor setting means 242 updates the value of the index register k by "+1" in step S505.

When the processing in step S503 or step S505 is finished, control proceeds to step S506 in which the cursor setting means 242 decides whether the value of the index register k is the same as the maximum number M of steps or not. If the value of the index register k is the same as the maximum number M of steps, then control goes to step S507 in which the cursor setting means 242 defines "0" as the value of the index register k.

If the value of the index register k is not the same as the maximum number M of steps, then the cursor setting means 262 decides whether the value of the index register k is "−1" or not in step S508. If the value of the index register k is "−1", then control goes to step S509 in which the cursor setting means 242 defines the maximum number M of steps as the value of the index register k.

When the processing in step S507 or step S509 is finished or if the value of the index register k is not "−1" in step S508, the process carried out by the cursor setting means 242 comes to an end.

The processing sequence of the pattern setting means 244 in step S106 shown in FIG. 24 will be described below with reference to FIG. 31.

Figure 31:
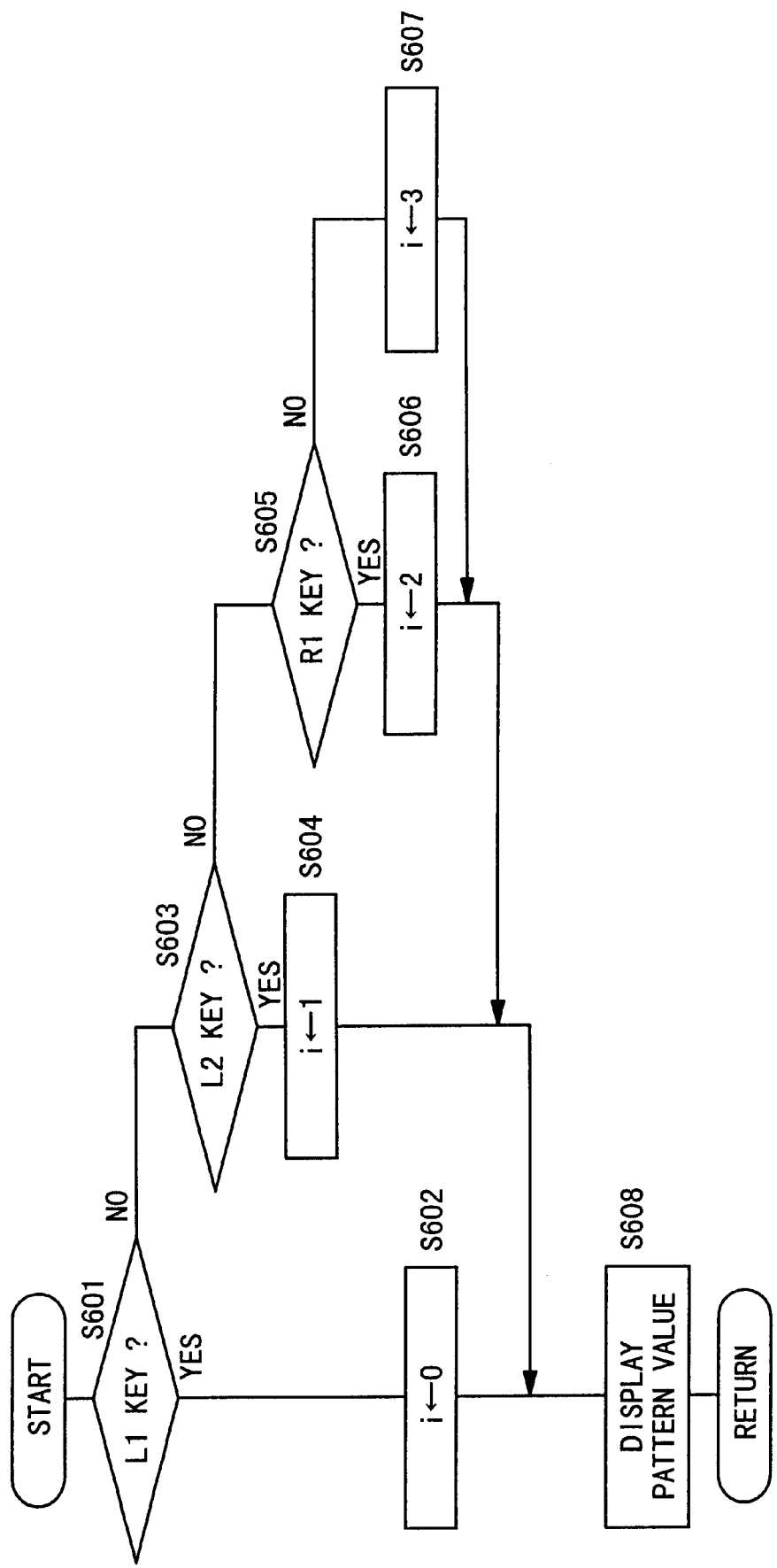
FIG. 31 is a flowchart of a processing sequence of a pattern setting means.

In step S601 shown in FIG. 31, the pattern setting means 244 decides whether the control data comes from the L1 key 114a or not. If the control data comes from the L1 key 114a, then control goes to step S602 in which the pattern setting means 244 stores a pattern value of "0" in the index register i.

If the control data does not come from the L1 key 114a in step S601, then control goes to step S602 in which the pattern setting means 244 decides whether the control data comes from the L2 key 114b or not. If the control data comes from the L2 key 114b, then control goes to step S604 in which the pattern setting means 244 stores a pattern value of "1" in the index register i.

If the control data does not come from the L2 key 114b in step S603, then control goes to step S605 in which the pattern setting means 244 decides whether the control data comes from the R1 key 116a or not. If the control data comes from the R1 key 116a, then control goes to step S606 in which the pattern setting means 244 stores a pattern value of "2" in the index register i.

If the control data does not come from the R1 key 116a, i.e., if the control data comes from the R2 key 116b, then control goes to step S607 in which the pattern setting means 244 stores a pattern value of "3" in the index register i.

When the processing in step S602, step S04, step S606, or step S607 is over, control goes to step S608 in which the setting image displaying means 230 displays the present pattern value stored in the index register i on the monitor 18. Specifically, the present pattern value is displayed laterally of the icons of the L button 38L and the R button 38R. When the processing in step S608 is finished, the processing sequence of the pattern setting means 244 is ended.

The processing sequence of the program initiating/ stopping means 246 in step S108 will be described below with reference to FIG. 32.

Figure 32:
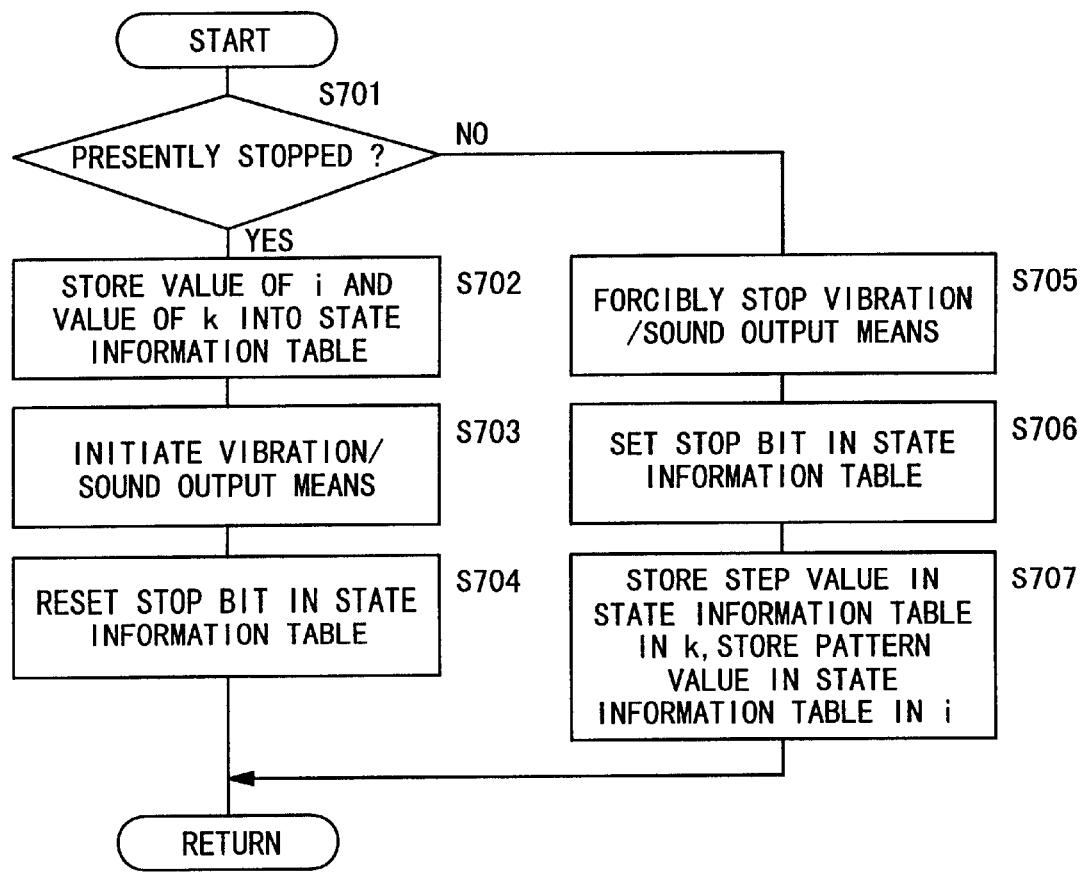
FIG. 32 is a flowchart of a processing sequence of a program initiating/stopping means.

In step S701 shown in FIG. 32, the program initiating/ stopping means 246 decides whether the vibration/sound output means 222 is presently stopped or initiated by deciding whether the stop bit in the state information table 250 is set to "1" or not. If the vibration/sound output means 222 is stopped, then control goes to step S702 in which the program initiating/stopping means 246 stores the value (pattern value) of the index register i and the value (step value) of the index register k into the state information table 250.

In step S703, the program initiating/stopping means 246 initiates the vibration/sound output means 222. Thereafter, in step S704, the program initiating/stopping means 246 resets the stop bit in the state information table 250 to "1".

If the vibration/sound output means 222 is initiated in step S701, then the program initiating/stopping means 246 forcibly puts the vibration/sound output means 222 to an end in step S705. Thereafter, in step S706, the program initiating/stopping means 246 sets the stop bit in the state information table 250 to "1". In step S707, the program initiating/stopping means 246 stores the step value stored in the state information table 250 in the index register k, and stores the pattern value stored in the state information table 250 in the index register i.

When the processing in step S704 or step S707 is finished, the processing sequence of the program initiating/stopping means 246 comes to an end.

The processing sequence of the vibration/non-vibration switching means 248 in step S110 shown in FIG. 24 will be described below with reference to FIG. 33.

Figure 33:
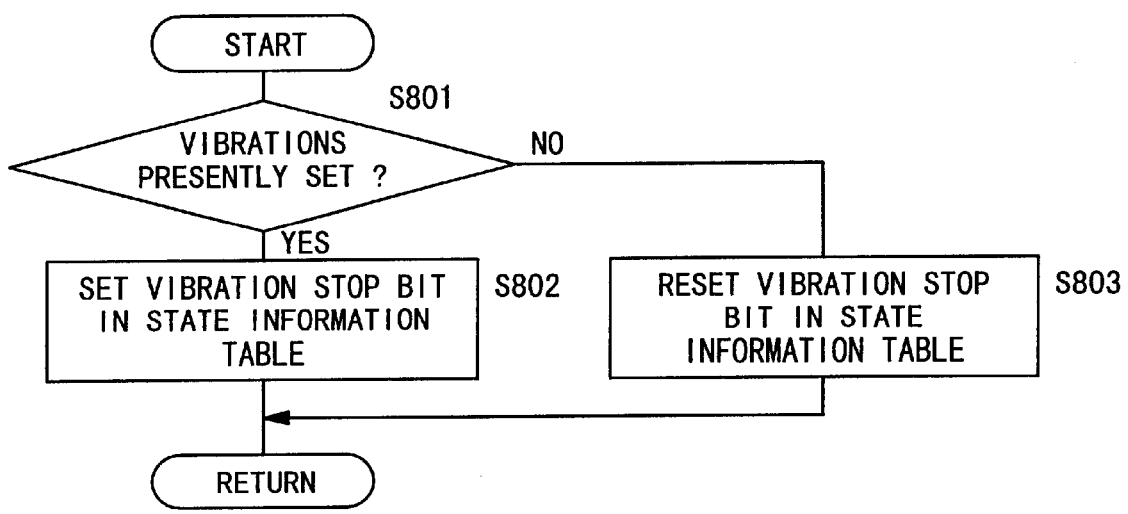
FIG. 33 is a flowchart of a processing sequence of a vibration/non-vibration switching means.

In step S801 shown in FIG. 33, the vibration/non-vibration switching means 248 decides whether vibrations have been set or not by deciding whether the vibration stop bit in the state information table 250 is reset to "0" or not.

If vibrations have been set, then control goes to step S802 in which the vibration/non-vibration switching means 248 sets the vibration stop bit in the state information table 250 to "1".

If vibrations have not been set, then control goes to step S803 in which the vibration/non-vibration switching means 248 resets the vibration stop bit in the state information table 250 to "1".

When the processing in step S802 or step S803 is finished, the processing sequence of the vibration/non-vibration switching means 248 comes to an end.

The processing sequence of the vibration/sound output means 222 will be described below with reference to FIGS. 34 through 36.

Figure 34:
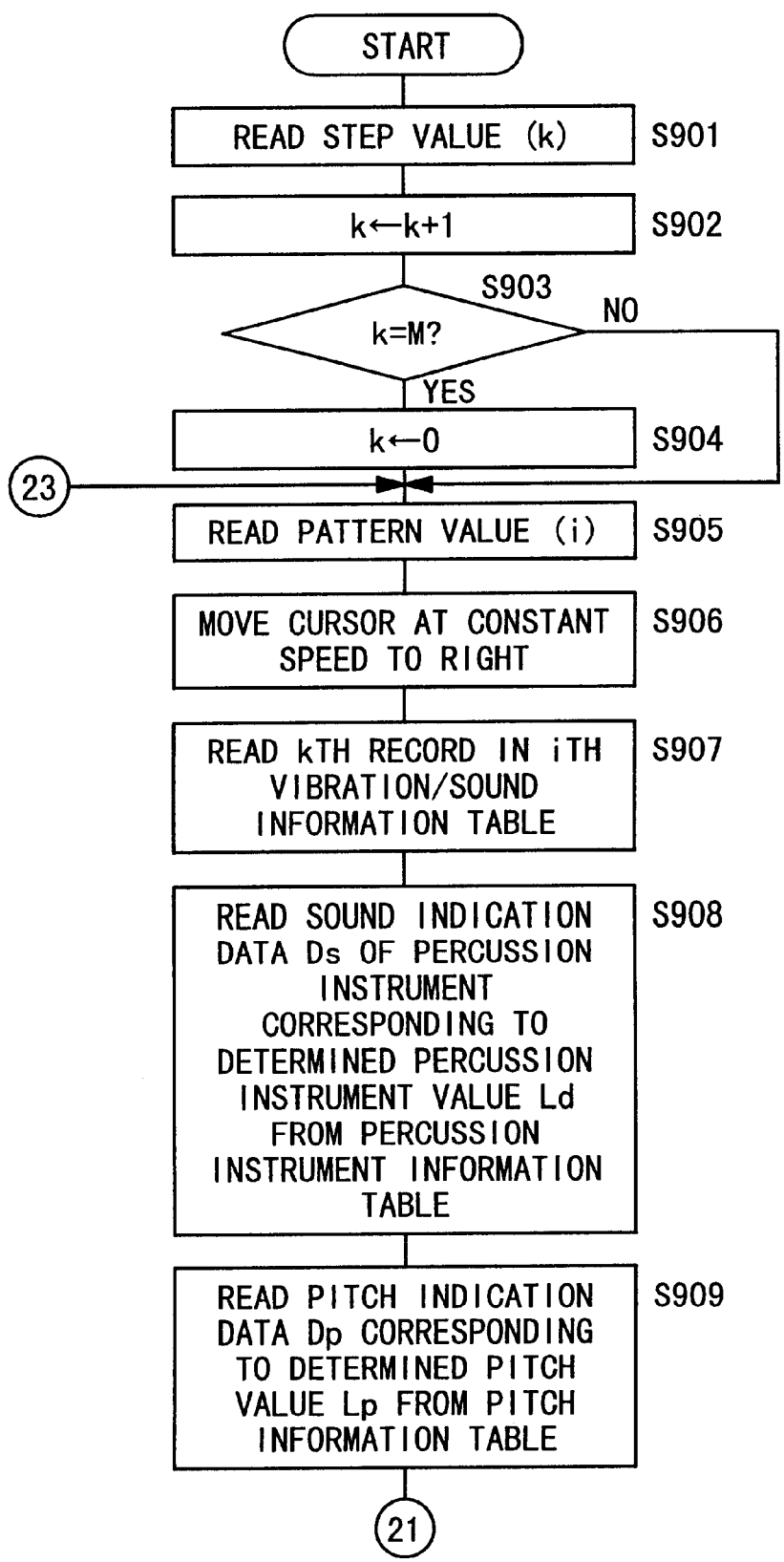
FIGS. 34 through 36 are a flowchart of a processing sequence of the vibration/sound output means.

In step S901 shown in FIG. 34, the table accessing means 284 of the vibration/sound output means 222 reads the step value from the state information table 250 and stores the read step value into the index register k.

In step S902, the vibration/sound output means 222 updates the value of the index register k by "−1". In step S903, the vibration/sound output means 222 decides whether the value of the index register k is the same as the maximum number M of steps or not. If the value of the index register k is the same as the maximum number M of steps, then control goes to step S904 in which the vibration/sound output means 222 initializes the value of the index register k to "−0".

In step S905, the table accessing means 284 reads the pattern value from the state information table 250 and stores the read pattern value into the index register i. Thereafter, in step S906, the cursor moving/displaying means 286 moves the cursor 210 to the right at a constant speed on the monitor 18.

In step S907, the table accessing means 284 reads the left vibrational value $V_L$, the right vibrational value $V_R$, the determined percussion instrument value Ld, and the determined pitch value Lp from the kth record in the ith vibration/sound information table 276.

In step S908, the table accessing means 284 reads sound indication data Ds for a percussion instrument corresponding to the determined percussion instrument value Ld from the percussion instrument information table 290. For example, if the determined percussion instrument value Ld is "4", then the table accessing means 284 reads sound indication data Ds for high hat (open) cymbals from the percussion instrument information table 290.

In step S909, the table accessing means 284 reads pitch indication data Dp corresponding to the determined pitch value Lp from the pitch information table 292. For example, if the determined pitch value Lp is "4", then the table accessing means 284 reads pitch indication data Dp for G from the pitch information table 292.

Figure 35:
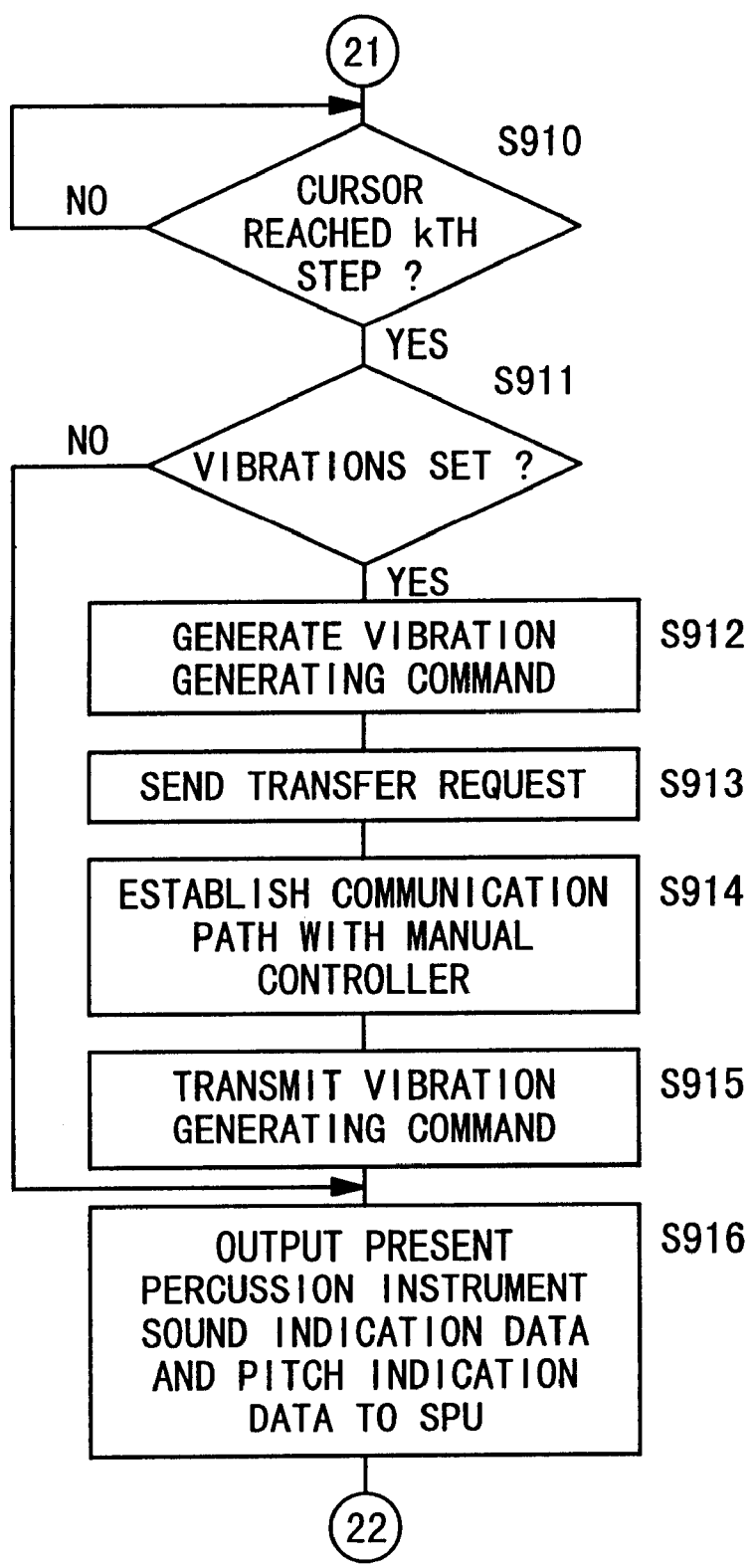

Thereafter, in step S910 shown in FIG. 35, the vibration/sound output means 222 waits until the cursor 210 reaches a kth step. If the cursor 210 reaches the kth step, then control goes to step S911 in which the vibration/sound output means 222 decides whether vibrations have been set or not by deciding whether the vibration stop bit in the state information table 250 is reset to "0" or not.

If vibrations have been set, then control goes to step S912 in which the vibration instructing means 288 generates a vibration generating command VC based on the left and right vibrational values $V_L$, $V_R$.

In step S913, the communication requesting means 280 sends a transfer request to the manual controller 16 via the communication controller 58. In step S914, the communication path establishing means 282 starts to communicate with the communication controller 150 of the manual controller 16 via the communication controller 58 to establish a communication path. In step S915, the vibration instructing means 288 transmits the vibration generating command VC via the established communication path to the manual controller 16.

A processing sequence of the manual controller 16 at this time will be described below with reference to FIG. 37.

In step SA01 shown in FIG. 37, the transfer request determining means 300 waits for a transfer request for control data from the entertainment apparatus 12.

If there is a data transfer request from the entertainment apparatus 12, then control proceeds to step SA02 in which the communication path establishing means 302 starts to communicate with the communication controller 58 of the entertainment apparatus 12 via the communication controller 150 to establish a communication path. At this time, the communication path establishing means 302 establishes a communication path in cooperation with the establishment of the communication path by the data processing means 220 in step S914.

In step SA03, the transmission/reception determining means 304 decides whether the present data transfer request from the entertainment apparatus 12 is a transmission request for control data or not.

Since the present data transfer request is a reception request for the vibration generating command VC, control goes to step SA06 in which the command receiving means 308 receives the vibration generating command VC from the entertainment apparatus 12 via the established communication path.

In step SA07, the command analyzing means 310 analyzes the received vibration generating command VC and outputs an analyzed result to the left and right motor drivers 170L, 170R.

The right motor driver 170R energizes the motor 130R based on the right vibrational value $V_R$ from the command analyzing means 310. Specifically, if the right vibrational value $V_R$ is "1", then the right motor driver 170R supplies a current to the motor 130R to energize the motor 130R, thus imparting certain vibrations to the right grip 108. If the right vibrational value $V_R$ is "0", then the right motor driver 170R stops supplying a current to the motor 130R.

The left motor driver 170L energizes the motor 130L such that the rotational speed of the motor 130L varies depending on the left vibrational value $V_L$ (0–255) from the command analyzing means 310, thereby vibrating the left grip 106 with a vibrational strength and frequency depending on the left vibrational value $V_L$.

After step SA07, control goes to step SA05 in which the end determining means 312 decides whether there is an end request to finish the processing in the manual controller 16 or not. If there is no end request, then control returns to step SA01 to receive the vibration generating command VC again.

Control then returns to the routine of the vibration/sound output means 222 shown in FIG. 35. When the processing in step S915 is finished or if vibrations have not been set in step S911, control goes to step S916 in which the sound indicating means 294 outputs the sound indication data Ds and the pitch indication data Dp for the present percussion instrument to the SPU 88.

Figure 36:
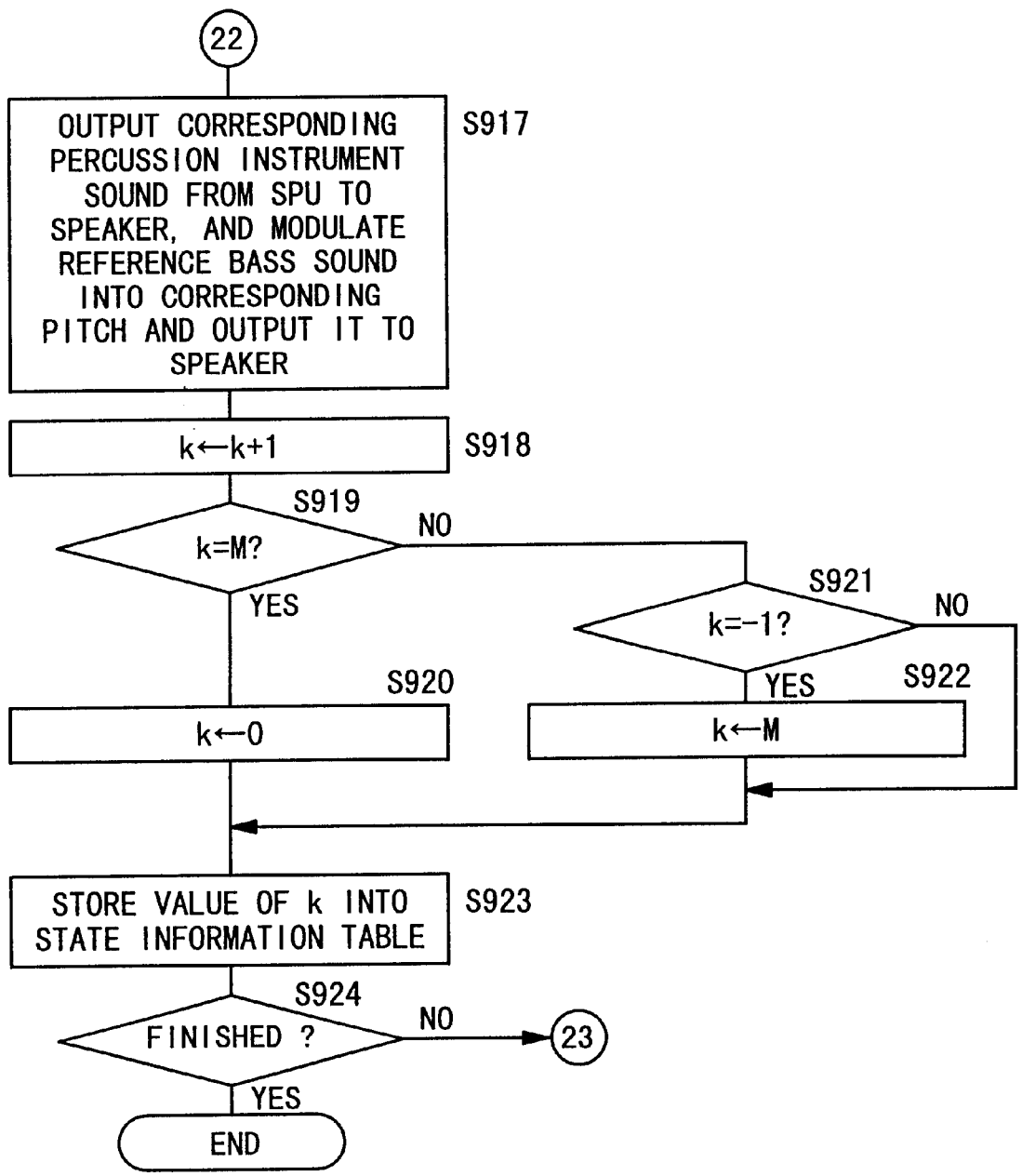

Then, in step S917 shown in FIG. 36, the SPU 88 outputs a percussion instrument sound represented by the supplied sound indication data Ds, among PCM sound sources stored in the sound buffer 90, to the speaker 92, and modulates a reference bass sound from the PCM sound sources into a pitch represented by the pitch indication data Dp and outputs the pitch to the speaker 92.

According to the above sequence from step S911 to step S917, when the cursor 210 reaches the kth step, the manual controller 16 generates vibrations according to the vibration generating command VC, and simultaneously, the speaker 92 of the monitor 18 outputs the sound of the percussion instrument that corresponds to the length of the first bar 208A and also outputs the bass sound at the pitch that corresponds to the length of the second bar 208B.

In step S918, the vibration/sound output means 222 updates the value of the index register k by "+1". Thereafter, in step S919, the vibration/sound output means 222 decides whether the value of the index register k is the same as the maximum number M of steps or not. If the value of the index register k is the same as the maximum number M of steps, then control goes to step S920 in which the vibration/sound output means 222 defines "0" as the value of the index register k.

If the value of the index register k is not the same as the maximum number M of steps in step S919, then the vibration/sound output means 222 decides whether the value of the index register k is "–1" or not in step S921. If the value of the index register k is "–1", then control goes to step S922 in which the vibration/sound output means 222 defines the maximum number M of steps as the value of the index register k.

When the processing in step S920 or step S922 is finished or if the value of the index register k is not "–1" step S921, control proceeds to step S923 in which the vibration/sound output means 222 stores the value (step value) of the index register k into the state information table 250.

In step S924, it is decided whether there is an end request to finish the processing sequence of the vibration/sound output means 222 or not. If there is no end request, then control returns to step S905 shown in FIG. 34 to produce vibrations and output sounds in a next step. If there is an end request, then the processing sequence of the vibration/sound output means 222 is ended.

As described above, the entertainment system 10 according to the above embodiment has the vibration/sound setting means 226 for setting up lengths of the first and second bars 208A, 208B displayed on the monitor 18 according to control inputs from the manual controller 16, setting up magnitudes of vibrations to be generated by the vibration imparting mechanisms 128R, 128L in the manual controller 16 depending on the lengths of the displayed bars 208A, 208B, and setting up a type of percussion instrument sound and/or a pitch of bass sound to be outputted to the speaker 92 of the monitor 18 depending on the lengths of the displayed bars 208A, 208B. Therefore, the user of the entertainment system 10 can set up a magnitude of vibrations and can receive such vibrations at any time the user wants. The user is capable of setting up a type of percussion instrument sound and/or a pitch of bass sound easily as desired through visual perception.

In the illustrated embodiment, while the monitor 18 is displaying the step bars 208 each composed of the first and second bars 208A, 208B, each time the cursor 210 moving at a constant speed on the monitor 18 is positioned at one of the step bars 208, the vibration/sound output means 222 imparts vibrations to the user at the magnitude set up by the vibration/sound setting means 226, and outputs the type of percussion instrument sound and/or the pitch of bass sound depending on the lengths of the first and second bars 208A, 208B to the speaker 92 of the monitor 18.

When the user varies the lengths of the first and second bars 208A, 208B. the user receives vibrations at different magnitudes as the cursor 210 moves on, and different types of percussion instrument sound and/or different pitches of bass sound are outputted as the cursor 210 moves on. The user can receive different types of vibrations at one step bar 208, and different types of instrument sound and/or different pitches of sound can be outputted at one step bar 208.

By varying the lengths of the first and second bars 208A, 208B of each step bar 208, the user can receive vibrations of different types at different magnitudes as the cursor 210 moves on, and different types of instrument sound and different pitches of sound can be outputted as the cursor 210 moves on.

The vibration/sound setting means 226 and the vibration/sound output means 222 cause the manual controller 16 to generate vibrations, output the type of percussion instrument sound depending on the lengths of the first bar 208A, and output the pitch of bass sound depending on the length of the second bar 208B, each time the cursor 210 reaches a step bar 208.

According to a first modification, each time the cursor 210 reaches a step bar 208, only the manual controller 16 may generate vibrations. In this modification, the percussion instrument setting means 266 and the pitch setting means 270 are removed from the vibration/sound setting means 226, providing a vibration setting means, and the sound indicating means 294 is removed from the vibration/sound output means 222, providing a vibration output means.

According to a second modification, each time the cursor 210 reaches a step bar 208, the manual controller 16 may not generate vibrations, but the type of percussion instrument sound corresponding to the length of the first bar 208A may be outputted, and the pitch of bass sound corresponding to the length of the second bar 208B may be outputted. In this modification, the left vibrational value setting means 268 and the right vibrational value setting means 272 are removed from the vibration/sound setting means 226, providing a sound setting means, and the vibration instructing means 288 is removed from the vibration/sound output means 222, providing a sound output means.

As described above, the entertainment system, the entertainment apparatus, the recording medium, and the program according to the present invention offer the following advantages:

(1) The user can set up magnitudes of vibrations as desired and can receive vibrations at any time the user wants.

(2) The user is allowed to visually set up the types of musical instruments and pitches thereof easily by changing the lengths of bars displayed on a monitor.

(3) The user can set up magnitudes of vibrations as desired and can receive vibrations at any time the user wants, and is also allowed to visually set up the types of musical instruments and pitches thereof easily by changing the lengths of bars displayed on a monitor.

Although a certain preferred embodiment of the present invention has been shown and described in detail, it should be understood that various changes and modifications may be made therein without departing from the scope of the appended claims.

What is claimed is:

1. An entertainment system comprising:
    an entertainment apparatus for executing various programs;
    at least one manual controller for entering manual control requests from a user into said entertainment apparatus;
    a display unit for displaying images outputted from said entertainment apparatus;
    said manual controller having a vibration generating device for imparting vibrations to the user in response to an external request; and
    vibration setting means for setting up a length of a bar displayed on said display unit according to a control input from said manual controller, and setting up a magnitude of vibrations to be generated by said vibration generating device depending on the length of said bar.

2. An entertainment system according to claim 1, wherein said display unit has means for displaying a plurality of bars, further comprising:
    vibration output means for imparting vibrations to the user at the magnitude set up by said vibration setting means each time a cursor on said display unit is positioned at one of said bars.

3. An entertainment system according to claim 1, wherein said manual controller has a plurality of vibration generating devices, and said display unit has means for displaying a plurality of bars which jointly provide a step bar, said vibration setting means comprising:
    means for setting up magnitudes of vibrations to be generated by said vibration generating devices depending on the lengths of the bars which jointly provide the step bar.

4. An entertainment system according to claim 3, wherein said display unit has means for displaying a plurality of step bars, further comprising:
    vibration output means for imparting vibrations to the user at the magnitude set up by said vibration setting means each time a cursor on said display unit is positioned at one of said step bars.

5. An entertainment system comprising:
    an entertainment apparatus for executing various programs;
    at least one manual controller for entering manual control requests from the user into said entertainment apparatus;
    a display unit for displaying images outputted from said entertainment apparatus;
    a sound output unit for outputting sounds outputted from said entertainment apparatus; and
    sound setting means for setting up a length of a bar displayed on said display unit according to a control input from said manual controller, and setting up a pitch of sound to be outputted to said sound output unit depending on the length of said bar.

6. An entertainment system according to claim 5, wherein said display unit has means for displaying a plurality of bars, further comprising:
    sound output means for outputting the pitch of sound depending on the length of said bars to said sound output unit each time a cursor on said display unit is positioned at one of said bars.

7. An entertainment system according to claim 5, wherein said display unit has means for displaying a plurality of bars which jointly provide a step bar, said sound setting means comprising:
    means for setting up the pitch of sound to be outputted to said sound output unit depending on the lengths of the bars which jointly provide the step bar.

8. An entertainment system according to claim 7, wherein said display unit has means for displaying a plurality of step bars, further comprising:
    sound output means for outputting the pitch of sound set up by said sound setting means to said sound output unit each time a cursor on said display unit is positioned at one of said step bars.

9. An entertainment system comprising:
    an entertainment apparatus for executing various programs;
    at least one manual controller for entering manual control requests from a user into said entertainment apparatus;
    a display unit for displaying images outputted from said entertainment apparatus;
    a sound output unit for outputting sounds outputted from said entertainment apparatus;
    said manual controller having a vibration generating device for imparting vibrations to the user in response to an external request; and
    vibration and sound setting means for setting up a length of a bar displayed on said display unit according to a control input from said manual controller, setting up a magnitude of vibrations to be generated by said vibration generating device depending on the length of said bar, and setting up a pitch of sound to be outputted to said sound output unit depending on the length of said bar.

10. An entertainment system according to claim 9, wherein said display unit has means for displaying a plurality of bars, further comprising:
    vibration and sound output means for imparting vibrations to the user at the magnitude set up by said vibration setting means and outputting the pitch of sound depending on the length of said bars to said sound output unit each time a cursor on said display unit is positioned at one of said bars.

11. An entertainment system according to claim 9, wherein said manual controller has a plurality of vibration generating devices, and said display unit has means for displaying a plurality of bars which jointly provide a step bar, said vibration and sound setting means comprising:

means for setting up magnitudes of vibrations to be generated by said vibration generating devices and setting up the pitch of sound to be outputted to said sound output unit depending on the lengths of the bars which jointly provide the step bar.

12. An entertainment system according to claim 11, wherein said display unit has means for displaying a plurality of step bars, further comprising:

vibration and sound output means for imparting vibrations to the user at the magnitude set up by said vibration setting means and outputting the pitch of sound set up by said sound setting means to said sound output unit each time a cursor on said display unit is positioned at one of said step bars.

13. An entertainment apparatus for connection to a manual controller for outputting at least a control request from a user, said manual controller having a vibration generating device for imparting vibrations to the user in response to an external request, and a display unit for displaying images, comprising:

vibration setting means for setting up a length of a bar displayed on said display unit according to a control input from said manual controller, and setting up a magnitude of vibrations to be generated by said vibration generating device depending on the length of said bar.

14. An entertainment apparatus for connection to a manual controller for outputting at least a control request from a user, said manual controller having a vibration generating device for imparting vibrations to the user in response to an external request, a display unit for displaying images, and a sound output unit for outputting sounds, comprising:

sound setting means for setting up a length of a bar displayed on said display unit according to a control input from said manual controller, and setting up a pitch of sound to be outputted to said sound output unit depending on the length of said bar.

15. An entertainment apparatus for connection to a manual controller for outputting at least a control request from a user, said manual controller having a vibration generating device for imparting vibrations to the user in response to an external request, a display unit for displaying images, and a sound output unit for outputting sounds, comprising:

vibration and sound setting means for setting up a length of a bar displayed on said display unit according to a control input from said manual controller, setting up a magnitude of vibrations to be generated by said vibration generating device depending on the length of said bar, and setting up a pitch of sound to be outputted to said sound output unit depending on the length of said bar.

16. A recording medium storing a program and data for use in an entertainment system having an entertainment apparatus for executing various programs, at least one manual controller for entering manual control requests from a user into said entertainment apparatus, and a display unit for displaying images outputted from said entertainment apparatus, said manual controller having a vibration generating device for imparting vibrations to the user in response to an external request, the program stored in said recording medium comprising the step of:

setting up a length of a bar displayed on said display unit according to a control input from said manual controller, and setting up a magnitude of vibrations to be generated by said vibration generating device depending on the length of said bar.

17. A recording medium according to claim 16, wherein said display unit has means for displaying a plurality of bars, said program further comprising the step of:

imparting vibrations to the user at the magnitude set up by said vibration setting means each time a cursor on said display unit is positioned at one of said bars.

18. A recording medium according to claim 16, wherein said manual controller has a plurality of vibration generating devices, and said display unit has means for displaying a plurality of bars which jointly provide a step bar (208), said setting step comprising:

setting up magnitudes of vibrations to be generated by said vibration generating devices depending on the lengths of the bars which jointly provide the step bar.

19. A recording medium according to claim 18, wherein said display unit has means for displaying a plurality of step bars, said program further comprising the step of:

imparting vibrations to the user at the magnitude set up by said vibration setting means each time a cursor on said display unit is positioned at one of said step bars.

20. A recording medium storing a program and data for use in an entertainment system having an entertainment apparatus for executing various programs, at least one manual controller for entering manual control requests from a user into said entertainment apparatus, a display unit for displaying images outputted from said entertainment apparatus, and a sound output unit for outputting sounds outputted from said entertainment apparatus, the program stored in said recording medium comprising the step of:

setting up a length of a bar displayed on said display unit according to a control input from said manual controller, and setting up a pitch of sound to be outputted to said sound output unit depending on the length of said bar.

21. A recording medium according to claim 20, wherein said display unit has means for displaying a plurality of bars, said program further comprising the step of:

outputting the pitch of sound depending on the length of said bars to said sound output unit each time a cursor on said display unit is positioned at one of said bars.

22. A recording medium according to claim 20, wherein said display unit has means for displaying a plurality of bars which jointly provide a step bar, said setting step comprising the step of:

setting up the pitch of sound to be outputted to said sound output unit depending on the lengths of the bars which jointly provide the step bar.

23. A recording medium according to claim 22, wherein said display unit has means for displaying a plurality of step bars, said program further comprising the step of:

outputting the pitch of sound set up by said sound setting means to said sound output unit each time a cursor on said display unit is positioned at one of said step bars.

24. A recording medium storing a program and data for use in an entertainment system having an entertainment apparatus for executing various programs, at least one manual controller for entering manual control requests from a user into said entertainment apparatus, a display unit for displaying images outputted from said entertainment apparatus, and a sound output unit for outputting sounds outputted from said entertainment apparatus, said manual controller having a vibration generating device for imparting vibrations to the user in response to an external request, the program stored in said recording medium comprising the step of:

setting up a length of a bar displayed on said display unit according to a control input from said manual controller, setting up a magnitude of vibrations to be generated by said vibration generating device depending on the length of said bar, and setting up a pitch of sound to be outputted to said sound output unit depending on the length of said bar.

25. A recording medium according to claim 24, wherein said display unit has means for displaying a plurality of bars, said program further comprising the step of:

imparting vibrations to the user at the magnitude set up by said vibration setting means and outputting the pitch of sound depending on the length of said bars to said sound output unit each time a cursor on said display unit is positioned at one of said bars.

26. A recording medium according to claim 24, wherein said manual controller has a plurality of vibration generating devices, and said display unit has means for displaying a plurality of bars which jointly provide a step bar, said setting step comprising the step of:

setting up magnitudes of vibrations to be generated by said vibration generating devices and setting up the pitch of sound to be outputted to said sound output unit depending on the lengths of the bars which jointly provide the step bar.

27. A recording medium according to claim 26, wherein said display unit has means for displaying a plurality of step bars, said program further comprising the step of:

imparting vibrations to the user at the magnitude set up by said vibration setting means and outputting the pitch of sound set up by said sound setting means to said sound output unit each time a cursor on said display unit is positioned at one of said step bars.

28. A program readable and executable by a computer, for use in an entertainment system having an entertainment apparatus for executing various programs, at least one manual controller for entering manual control requests from a user into said entertainment apparatus, and a display unit for displaying images outputted from said entertainment apparatus, said manual controller having a vibration generating device for imparting vibrations to the user in response to an external request, said program comprising the step of:

setting up a length of a bar displayed on said display unit according to a control input from said manual controller, and setting up a magnitude of vibrations to be generated by said vibration generating device depending on the length of said bar.

29. A program readable and executable by a computer, for use in an entertainment system having an entertainment apparatus for executing various programs, at least one manual controller for entering manual control requests from a user into said entertainment apparatus, a display unit for displaying images outputted from said entertainment apparatus, and a sound output unit for outputting sounds outputted from said entertainment apparatus, said program comprising the step of:

setting up a length of a bar displayed on said display unit according to a control input from said manual controller, and setting up a pitch of sound to be outputted to said sound output unit depending on the length of said bar.

30. A program readable and executable by a computer, for use in an entertainment system having an entertainment apparatus for executing various programs, at least one manual controller for entering manual control requests from the user into said entertainment apparatus, a display unit for displaying images outputted from said entertainment apparatus, and a sound output unit for outputting sounds outputted from said entertainment apparatus, said manual controller having a vibration generating device for imparting vibrations to the user in response to an external request, said program comprising the step of:

setting up a length of a bar displayed on said display unit according to a control input from said manual controller, setting up a magnitude of vibrations to be generated by said vibration generating device depending on the length of said bar, and setting up a pitch of sound to be outputted to said sound output unit depending on the length of said bar.

\* \* \* \* \*